(12) United States Patent
Jeon et al.

(10) Patent No.: US 8,488,677 B2
(45) Date of Patent: Jul. 16, 2013

(54) METHOD AND AN APPARATUS FOR DECODING/ENCODING A VIDEO SIGNAL

(75) Inventors: Yong Joon Jeon, Seoul (KR); Byeong Moon Jeon, Seoul (KR); Seung Wook Park, Seoul (KR)

(73) Assignee: LG Electronics Inc., Seoul (KR)

( * ) Notice: Subject to any disclaimer, the term of this patent is extended or adjusted under 35 U.S.C. 154(b) by 888 days.

(21) Appl. No.: 12/451,065

(22) PCT Filed: Apr. 25, 2008

(86) PCT No.: PCT/KR2008/002374
§ 371 (c)(1),
(2), (4) Date: Oct. 23, 2009

(87) PCT Pub. No.: WO2008/133455
PCT Pub. Date: Nov. 6, 2008

(65) Prior Publication Data
US 2010/0111183 A1    May 6, 2010

Related U.S. Application Data

(60) Provisional application No. 60/907,965, filed on Apr. 25, 2007, provisional application No. 60/907,990, filed on Apr. 26, 2007, provisional application No. 60/924,026, filed on Apr. 27, 2007, provisional application No. 60/924,079, filed on Apr. 30, 2007, provisional application No. 60/924,232, filed on May 4, 2007, provisional application No. 60/924,614, filed on May 23, 2007, provisional application No. 60/924,695, filed on May 29, 2007, provisional application No. 60/929,218, filed on Jun. 18, 2007, provisional application No. 60/948,201, filed on Jul. 6, 2007, provisional application No. 60/951,936, filed on Jul. 25, 2007, provisional application No. 60/956,112, filed on Aug. 15, 2007, provisional application No. 60/980,174, filed on Oct. 16, 2007, provisional application No. 60/986,294, filed on Nov. 8, 2007, provisional application No. 60/986,295, filed on Nov. 8, 2007, provisional application No. 60/992,693, filed on Dec. 5, 2007, provisional application No. 61/018,485, filed on Jan. 1, 2008, provisional application No. 61/019,854, filed on Jan. 9, 2008, provisional application No. 61/042,246, filed on Apr. 3, 2008.

(51) Int. Cl.
*H04N 7/12* (2006.01)
*H04N 11/02* (2006.01)
*H04N 11/04* (2006.01)

(52) U.S. Cl.
USPC ............................... 375/240.16; 375/240.12

(58) Field of Classification Search
USPC ....................................... 375/240.16
See application file for complete search history.

(56) References Cited

U.S. PATENT DOCUMENTS

| 6,043,838 A | 3/2000 | Chen |
| 2003/0202592 A1 | 10/2003 | Sohn et al. |

(Continued)

FOREIGN PATENT DOCUMENTS
EP    2103143    9/2009

OTHER PUBLICATIONS wftp3.itu.Int - /av-arch/jvt-site/2008_01_Antalya/ [online], internet URL:http:wtfp3.itu/av-arch/jvt-site/2008_01_Antalya/.

(Continued)

*Primary Examiner* — Chikaodili E Anyikire
(74) *Attorney, Agent, or Firm* — Harness, Dickey & Pierce, P.L.C.

(57) ABSTRACT

A method of decoding a video signal is disclosed. The present invention includes searching a reference block using side information, deriving motion information of a current block from the reference block, decoding the current block using the motion information of the current block, wherein the side information includes offset information indicating a position difference between the reference block and a corresponding block and wherein the corresponding block is a block indicated by a global motion vector indicating a disparity difference between a view of the current block and a view of the reference block.

12 Claims, 16 Drawing Sheets

U.S. PATENT DOCUMENTS

| | | |
|---|---|---|
| 2005/0008240 A1 | 1/2005 | Banerji et al. |
| 2005/0201471 A1 | 9/2005 | Hannuksela et al. |
| 2006/0146143 A1 | 7/2006 | Xin et al. |
| 2007/0030911 A1 | 2/2007 | Yoon |
| 2008/0089412 A1 | 4/2008 | Ugur et al. |

OTHER PUBLICATIONS

European Search Report dated Aug. 2, 2010 for Application No. 08723247.6.

Koo, Han-Suh, et al. "Motion Skip Mode for MVC"—Joint Video Team (JVT) of ISO/IEC MPEG & ITU-T VCEG (ISO/IEC JTC1/SC29/WG11 and ITU-T SG16 Q6)—Hangzhou, China, Oct. 2006.

Koo, Han Suh, et al. "CE11: MVC Motion Skip Mode"—Joint Video Team (JVT) of ISO/IEC MPEG & ITU-T VCEG (ISO/IEC JTC1/SC29/WG11 and ITU-T SG16 Q6)—Marrakech, Morocco, Jan. 2007.

Song, Hak-Sup, et al. "Macroblock Information Skip for MVC"—Joint Video Team (JVT) of ISO/IEC MPEG & ITU-T VCEG (ISO/IEC JTC1/SC29/WG11 and ITU-T SG16 Q6)—Marrakech, Morocco, Jan. 2007.

European Search Report dated Aug. 2, 2010 for Application No. 08753188.5.

Kimata, Hideaki et al. "AHG Report: JMVM & JD Text Editing"—Joint Video Team (JVT) of ISO/IEC MPEG & ITU-T VCEG (ISO/IEC JTC1/SC29/WG11 and ITU-T SG16 Q6), Marrakech, Morocco Jan. 2006.

Richardson, "H.264 and MPEG-4 Video Compression," Wiley 2003.

Office Action for corresponding U.S. Appl. No. 12/449,893 dated Feb. 28, 2012.

European Office Action dated Apr. 8, 2011 for corresponding European Application No. 08753188.5.

Koo H S et al: "MVC Motion Skip Mode", Joint Video Team (JVT) of ISO/IEC MPEG & ITU-T VCEG (ISO/IEC JTC1/SC29/WG11 and ITU-T SG16 Q.6), JVT-W081, Apr. 19, 2007, XP030007041.

Song H S et al: "MVC skip mode", ITU Study Group 16—Video Coding Experts Group—ISO/IEC MPEG & ITU-T VCEG (ISO/IEC JTC1/SC29/WG11 and ITU-T SG16 Q6), XX, XX, No. JVT-V052, Jan. 16, 2007, XP030006860.

Yang H et al: "CE1: Fine motion matching for motion skip mode in MVC", 26. JVT Meeting; 83. MPEG Meeting; Jan. 13, 2008-Jan. 18, 2008; Antalya; (Joint Video Team of ISO/IEC JTC1/SC29/WG11 and ITU-T SG. 16), No. JVT-Z021, Jan. 14, 2008, XP030007310.

International Search Report dated Jun. 11, 2008.

FIG. 8a

```
macroblock_layer() {
    if(!anchor_pic_flag) {
        i = ViewCodingOrder(view_id)
S810    if( (num_non_anchor_ref_l0[i]>0)||(num_non_anchor_ref_l1[i]>0)){
            motion_skip_flag
S820        if(motion_skip_flag){
S830            view_id_motion_skip
            }
        }
    }
    if(!motion_skip_flag){
        ...
    }
}
```

FIG. 8b

```
macroblock_layer() {
    if(!anchor_pic_flag) {
        i = ViewCodingOrder(view_id)
S840    if( (num_non_anchor_ref_l0[i]>0)||(num_non_anchor_ref_l1[i]>0)){
            motion_skip_flag
S850        if(motion_skip_flag){
S860            ref_idx_motion_skip
            }
        }
    }
    if(!motion_skip_flag){
        ...
    }
}
```

FIG. 8c

```
macroblock_layer() {
    if(!anchor_pic_flag) {
        i = ViewCodingOrder(view_id)
S870    if( (num_non_anchor_ref_l0[i]>0)||(num_non_anchor_ref_l1[i]>0))}
            motion_skip_flag
S880        if(motion_skip_flag){
S890            view_idx
            }
        }
    }
    if(!motion_skip_flag){
        ...
    }
}
```

FIG. 8d

| View Index (vIdx) | Global Motion Vector | View Identification Information of Reference block |
|---|---|---|
| 0 | global_disparity_mb_l0[0] | non_anchor_ref_l0[i][0] |
| 1 | global_disparity_mb_l1[0] | non_anchor_ref_l1[i][0] |
| 2 | global_disparity_mb_l0[1] | non_anchor_ref_l0[i][1] |
| 3 | global_disparity_mb_l1[1] | non_anchor_ref_l1[i][1] |
| 4 | global_disparity_mb_l0[2] | non_anchor_ref_l0[i][2] |
| 5 | global_disparity_mb_l1[2] | non_anchor_ref_l1[i][2] |
| ... | ... | ... |

FIG. 9
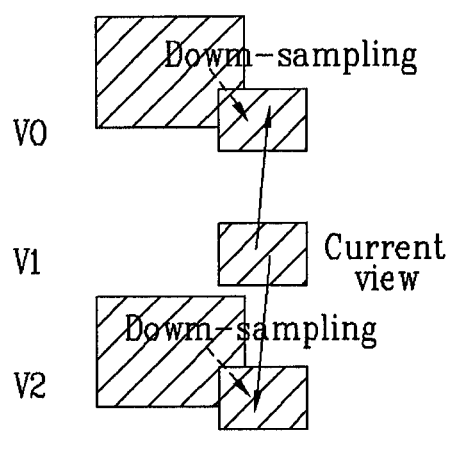
(a)
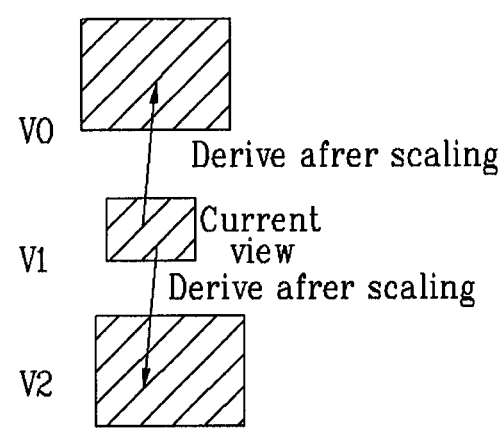
(b)

FIG. 13a

| seq_paramerer_set_mvc_extension( ){ |
|---|
|  |
| for(i = 1; i<= num_views_minus_1; i++) { |
| num_motion_skip_refs_l0[i] |
| for( j = 0; j < num_motion_skip_refs_l0[i]; j++() |
| motion_skip_ref_l0[i][j] |
| num_motion_skip_refs_l1[i] |
| for( j = 0; j < num_motion_skip_refs_l1[i]; j++() |
| motion skip ref l1[i][j] |
| } |
| } |

S1310 — num_motion_skip_refs_l0[i]
S1320 — motion_skip_ref_l0[i][j]
S1330 — num_motion_skip_refs_l1[i]
S1340 — motion skip ref l1[i][j]

FIG. 13b

```
slice_header() {
    first_mb_in_slice
    slice_type
    ic_enable
    i = InverseViewID(view_id)
    if ( !anchor_pic_flag && (num_motion_skip_ref_l0[i] >0 ||
                              num motion skip ref l1[i]>0))
        motion skip enable flag
        if ( anchor_ pic_flag) {
            i = InverseViewID( view id )
            if( slice_type = = P || slice_type = = B ) {
                for( j=0; j<num_motion_skip_ref_l0[i]; j++ ) {
                    for( compIdx = 0; compIdx<2; compIdx++)
                        global_disparity_mb_l0 [j][ compIdx ]
                }
            }
            if(( slice type = = B ) {
                for( j=0; j<=num motion skip ref l1 [i]; j++) {
                    for(compIdx = 0; compIdx <2; compIdx++)
                        global_disparity_mb_l1 [j][ compIdx ]
                }
            }
        }
    }
    pic_parameter_set_id
    frame num
    ...
}
```

S1350 brackets the section from the `if ( !anchor_pic_flag...` line through the closing braces before `pic_parameter_set_id`.

METHOD AND AN APPARATUS FOR DECODING/ENCODING A VIDEO SIGNAL

This application is a National Phase entry of PCT Application No. PCT/KR2008/002374, filed on Apr. 25, 2008, which claims priority under 35 U.S.C. §119(e), 120 and 365 (c) to U.S. Provisional Application No. 60/907,965, filed on Apr. 25, 2007, U.S. Provisional Application No. 60/907,990, filed on Apr. 26, 2007, U.S. Provisional Application No. 60/924,026, filed on Apr. 27, 2007, U.S. Provisional Application No. 60/924,079, filed on Apr. 30, 2007, U.S. Provisional Application No. 60/924,232, filed on May 4, 2007, U.S. Provisional Application No. 60/924,614, filed on May 23, 2007, U.S. Provisional Application No. 60/924,695, filed on May 29, 2007, U.S. Provisional Application No. 60/929,218, filed on Jun. 18, 2007, U.S. Provisional Application No. 60/948,201, filed on Jul. 6, 2007, U.S. Provisional Application No. 60/951,936, filed on Jul. 25, 2007, U.S. Provisional Application No. 60/956,112, filed on Aug. 15, 2007, U.S. Provisional Application No. 60/980,174, filed on Oct. 16, 2007, U.S. Provisional Application No. 60/986,294, filed on Nov. 8, 2007, U.S. Provisional Application No. 60/986,295, filed on Nov. 8, 2007, U.S. Provisional Application No. 60/992,693, filed on Dec. 5, 2007, U.S. Provisional Application No. 61/018,485, filed on Jan. 1, 2008, U.S. Provisional Application No. 61/019,854, filed on Jan. 9, 2008, and U.S. Provisional Application No. 61/042,246, filed on Apr. 3, 2008 in the U.S. Patent and Trademark Office, the contents of each of which are incorporated by reference in its entirety.

TECHNICAL FIELD

The present invention relates to coding of a video signal.

BACKGROUND ART

Compression coding means a series of signal processing techniques for transmitting digitalized information via a communication circuit or storing the digitalized information in a form suitable for a storage medium. As targets of compression coding, there are audio, video, characters, etc. In particular, a technique for performing compression coding on video is called video sequence compression. A video sequence is generally characterized in having spatial redundancy or temporal redundancy.

DISCLOSURE OF THE INVENTION

Technical Problem

Technical Solution

Accordingly, the present invention is directed to a method and apparatus for decoding/encoding a video signal that can substantially enhance efficiency in coding the video signal.

An object of the present invention is to provide a method and apparatus for decoding/encoding a video signal, by which motion compensation can be performed by obtaining motion information of a current picture based on relationship of inter-view pictures.

Another object of the present invention is to provide a method and apparatus for decoding/encoding a video signal, by which a restoration rate of a current picture can be enhanced using motion information of a reference view having high similarity to motion information of the current picture.

Another object of the present invention is to efficiently perform coding on a video signal by defining inter-view information capable of identifying a view of picture.

Another object of the present invention is to provide a method of managing reference pictures used for inter-view prediction, by which a video signal can be efficiently coded.

Another object of the present invention is to provide a method of predicting motion information of a video signal, by which the video signal can be efficiently processed.

A further object of the present invention is to provide a method of searching for a block corresponding to a current block, by which a video signal can be efficiently processed.

Advantageous Effects

According to the present invention, signal processing efficiency can be enhanced by predicting motion information using temporal and spatial correlations of a video sequence. More precise prediction is enabled by predicting coding information of a current block using coding information of a picture having high correlation with the current block, whereby a transmitting error is reduced to perform efficient coding. Even if motion information of a current block is not transmitted, it is able to calculate motion information very similar to that of the current block. Hence, a restoration rate is enhanced.

Moreover, coding can be efficiently carried out by providing a method of managing reference pictures used for inter-view prediction. In case that inter-view prediction is carried out by the present invention, a burden imposed on a DPB (decoded picture buffer) is reduced. Therefore, a coding rate can be enhanced and more accurate prediction is enabled to reduce the number of bits to be transmitted. Besides, more efficient coding is enabled using various kinds of configuration informations on a multi-view sequence.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIGS. 8A to 8D are diagrams for various examples to indicate a view used for a motion skip in case that at least one reference view is usable according to an embodiment of the present invention;

FIGS. 9A to 10B are diagrams to explain a method of performing inter-view prediction in case that a spatial resolution is different between views according to an embodiment of the present invention;

FIG. 13A and FIG. 13B are diagrams of syntaxes indicating scaled inter-view reference information according to an embodiment of the present invention.

BEST MODE

Figure 1:
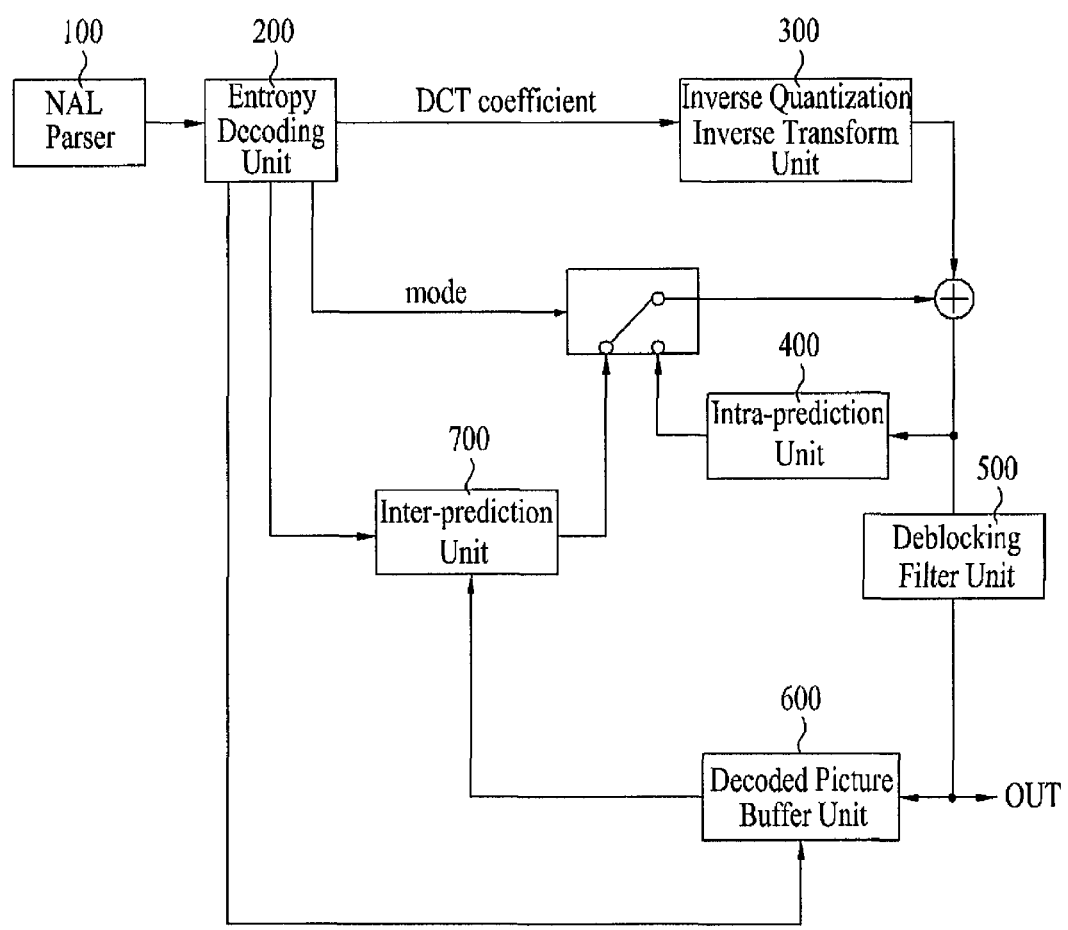
FIG. 1 is a schematic block diagram of a video signal decoding apparatus according to an embodiment of the present invention.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, a method of decoding a video signal according to the present invention includes searching a reference block using side information, deriving motion information of a current block from the reference block, decoding the current block using the motion information of the current block, wherein the side information includes offset information indicating a position difference between the reference block and a corresponding block and wherein the corresponding block is a block indicated by a global motion vector indicating a disparity difference between a view of the current block and a view of the reference block.

Preferably, the method further includes obtaining second flag information indicating whether the motion information of the current block is derived and obtaining the side information based on the second flag information.

More preferably, the second flag information is obtained from a macroblock layer.

In this case, the method further includes obtaining first flag information indicating whether a current slice uses motion skip, wherein the second flag information is obtained based on the first flag information.

And, the first flag information is obtained from a slice header.

More preferably, the first flag information or the second flag information is obtained based on inter-view picture group identification information.

In this case, when a current picture corresponds to a non-inter-view picture group according to the inter-view picture group identification information, the first flag information or the second flag information is obtained.

And, the first flag information is obtained based on inter-view reference information indicating inter-view reference relation.

In this case, the inter-view reference information is obtained from an extension area of a sequence parameter set.

And, the inter-view reference information includes the number information of an inter-view reference picture of a non-inter-view picture group.

Moreover, at least one inter-view reference picture of the non-inter-view picture group exists in a L0 direction and/or a L1 direction.

Preferably, the method further includes deriving an amended global motion vector using the global motion vector and the offset information, wherein position information of the reference block is derived using the amended global motion vector.

Preferably, the global motion vector is obtained based on inter-view reference information indicating inter-view reference relation.

More preferably, the inter-view reference information includes number information of inter-view reference picture of a non-inter-view picture group and the global motion vector is obtained as many as the number information of the inter-view reference picture of the non-inter-view picture group.

Preferably, the global motion vector is obtained based on inter-view picture group identification information.

More preferably, if a current picture corresponds to an inter-view picture group according to the inter-view picture group identification information, the global motion vector is obtained.

Preferably, the video signal is received as a broadcast signal.

Preferably, the video signal is received via digital medium.

To further achieve these and other advantages and in accordance with the purpose of the present invention, a apparatus for decoding a video signal includes a corresponding block searching unit searching a reference block using side information, a motion information deriving unit deriving motion information of a current block from the reference block, and a motion compensating unit decoding the current block using the motion information of the current block, wherein the side information includes offset information indicating a position difference between the reference block and a corresponding block and wherein the corresponding block is a block indicated by a global motion vector indicating a disparity difference between a view of the current block and a view of the reference block.

It is to be understood that both the foregoing general description and the following detailed description are exemplary and explanatory and are intended to provide further explanation of the invention as claimed.

MODE FOR INVENTION

Reference will now be made in detail to the preferred embodiments of the present invention, examples of which are illustrated in the accompanying drawings.

First of all, compression coding of video signal data considers spatial redundancy, spatial redundancy, scalable redundancy, and inter-view redundancy. And, compression coding is enabled by considering inter-view existing mutual redundancy in the course of the compression coding. Compression coding scheme, which takes inter-view redundancy into consideration, is just an embodiment of the present invention. And, the technical idea of the present invention is applicable to temporal redundancy, scalable redundancy, and the like. In this disclosure, coding can include both concepts of encoding and decoding. And, coding can be flexibly interpreted to correspond to the technical idea and scope of the present invention.

Looking into a bit sequence configuration of a video signal, there exists a separate layer structure called a NAL (network abstraction layer) between a VCL (video coding layer) dealing with a moving picture encoding process itself and a lower system that transmits and stores encoded information. An output from an encoding process is VCL data and is mapped by NAL unit prior to transmitting or storing. Each NAL unit includes compressed video data or RBSP (raw byte sequence payload: result data of moving picture compression) that is the data corresponding to header information.

The NAL unit basically includes two parts, a NAL header and an RBSP. The NAL header includes flag information (nal_ref_idc) indicating whether a slice as a reference picture of the NAL unit is included and an identifier (nal_unit_type) indicating a type of the NAL unit. Compressed original data is stored in the RBSP. And, RBSP trailing bit is added to a last portion of the RBSP to represent a length of the RBSP as an 8-bit multiplication. As the types of the NAL unit, there are IDR (instantaneous decoding refresh) picture, SPS (sequence parameter set), PPS (picture parameter set), SEI (supplemental enhancement information), and the like.

In the standardization, requirements for various profiles and levels are set to enable implementation of a target product with an appropriate cost. In this case, a decoder should meet the requirements decided according the corresponding profile and level. Thus, two concepts, 'profile' and 'level' are defined to indicate a function or parameter for representing how far the decoder can cope with a range of a compressed sequence. And, a profile identifier (profile_idc) can identify that a bit stream is based on a prescribed profile. The profile identifier means a flag indicating a profile on which a bit stream is based. For instance, in H.264/AVC, if a profile identifier is 66, it means that a bit stream is based on a baseline profile. If a profile identifier is 77, it means that a bit stream is based on a main profile. If a profile identifier is 88, it means that a bit stream is based on an extended profile. Moreover, the profile identifier can be included in a sequence parameter set.

Therefore, in order to handle a multi-view sequence, it needs to be identified whether an inputted bit stream is a multi-view profile. If the inputted bit stream is the multi-view profile, it is necessary to add syntax to enable at least one additional information for multi-view to be transmitted. In this case, the multi-view profile indicates a profile mode for handling multi-view video as an additional technique of H.264/AVC. In MVC, it may be more efficient to add syntax as additional information for an MVC mode rather than unconditional syntax. For instance, when a profile identifier of AVC indicates a multi-view profile, if information for a multi-view sequence is added, it is able to enhance encoding efficiency.

Sequence parameter set indicates header information containing information crossing over encoding of an overall sequence such as a profile, a level, and the like. A whole compressed moving picture, i.e., a sequence should start from a sequence header. So, a sequence parameter set corresponding to header information should arrive at a decoder before the data referring to the parameter set arrives. Namely, the sequence parameter set RBSP plays a role as the header information for the result data of the moving picture compression. Once a bit stream is inputted, a profile identifier preferentially identifies that the inputted bit stream is based on which one of a plurality of profiles. So, by adding a part for determining whether an inputted bit stream relates to a multi-view profile (e.g., 'If (profile_idc== MULTI_VIEW_PROFILE)') to syntax, it is determined whether the inputted bit stream relates to the multi-view profile. Various kinds of configuration information can be added only if the inputted bit stream is approved as relating to the multi-view profile. For instance, it is able to add a total number of views, a number of inter-view reference pictures, a view identification number of an inter-view reference picture, and the like. And, a decoded picture buffer can use various kinds of informations on an interview reference picture to construct and manage a reference picture list.

FIG. 1 is a schematic block diagram of an apparatus for decoding a video signal according to the present invention.

Referring to FIG. 1, the decoding apparatus includes a parsing unit 100, an entropy decoding unit 200, an inverse quantization/inverse transform unit 300, an intra-predicting unit 400, a deblocking, filter unit 500, a decoded picture buffer unit 600, an inter-prediction unit 700, and the like. And, the decoded picture buffer unit 600 mainly includes a reference picture storing unit (not shown in the drawing), a reference picture list constructing unit (not shown in the drawing), a reference picture managing unit (not shown in the drawing), and the like. Moreover, the inter-prediction unit 700 can include a motion skip determining unit 710, a corresponding block searching unit 720, a motion information deriving unit 730, a motion compensating unit 740, and a motion information obtaining unit 750.

The parsing unit 100 carries out parsing by NAL unit to decode a received video sequence. In general, at least one sequence parameter set and at least one picture parameter set are transferred to a decoder before a slice header and slice data are decoded. In this case, various kinds of configuration informations can be included in a NAL header area or an extension area of a NAL header. Since MVC is an additional scheme for a conventional AVC scheme, it may be more efficient to add various configuration informations in case of an MVC bit stream only rather than unconditional addition. For instance, it is able to add flag information for identifying a presence or non-presence of an MVC bit stream in the NAL header area or the extension area of the NAL header. Only if an inputted bit stream is a multi-view sequence coded bit stream according to the flag information, it is able to add configuration informations for a multi-view sequence. For instance, the configuration informations can include view identification information, inter-view picture group identification information, inter-view prediction flag information, temporal level information, priority identification information, identification information indicating whether it is an instantaneous decoded picture for a view, and the like. They will be explained in detail with reference to FIG. 2.

The entropy decoding unit 200 carries out entropy decoding on a parsed bit stream and a coefficient of each macroblock, a motion vector, and the like are then extracted. The inverse quantization/inverse transform unit 300 obtains a coefficient value transformed by multiplying a received quantized value by a predetermined constant and then transforms the coefficient value inversely to reconstruct a pixel value. Using the reconstructed pixel value, the intra-predicting unit 400 performs intra-screen prediction from a decoded sample within a current picture. Meanwhile, the deblocking filter unit 500 is applied to each coded macroblock to reduce block distortion. A filter smoothens a block edge to enhance an image quality of a decoded frame. Selection of a filtering process depends on boundary strength and gradient of an image sample around a boundary. Pictures through filtering are outputted or stored in the decoded picture buffer unit 600 to be used as reference pictures.

The decoded picture buffer unit 600 plays a role in storing or opening the previously coded pictures to perform inter-picture prediction. In this case, to store the pictures in the decoded picture buffer unit 600 or to open the pictures, 'frame_num' of each picture and POC (picture order count) are used. So, in MVC, since there exist pictures in a view different from that of a current picture exists among the previously coded pictures, in order to use these pictures as reference pictures, view information for identifying a picture is usable together with the 'frame_num' and the POC. The decoded picture buffer unit 600 includes the reference picture storing unit (not shown in the drawing), the reference picture list constructing unit (not shown in the drawing), and the reference picture managing unit (not shown in the drawing).

The reference picture storing unit stores pictures that will be referred to for the coding of the current picture. The reference picture list constructing unit constructs a list of reference pictures for the inter-picture prediction. In multi-view video coding, inter-view prediction is possible. Therefore, if a current picture refers to a picture in another view, it may be necessary to construct a reference picture list for the inter-view prediction.

The reference picture list constructing unit can use information on view in constructing the reference picture list for the inter-view prediction. For instance, inter-view reference information can be used. Inter-view reference information means information used to indicate an inter-view dependent relation. For instance, there can be a total number of views, a view identification number, a number of inter-view reference pictures, a view identification number of an inter-view reference picture, and the like.

The reference picture managing unit manages reference pictures to perform inter-picture prediction more flexibly. For instance, a memory management control operation method and a sliding window method are usable. This is to manage a reference picture memory and a non-reference picture memory by unifying the memories into one memory and realize efficient memory management with a small memory. In multi-view video coding, since pictures in a view direction have the same picture order count, information for identifying a view of each of the pictures is usable in marking them. And, reference pictures managed in the above manner can be used by the inter-prediction unit 700.

Through the above-described process, the inter-predicted pictures and the intra-predicted pictures are selected according to a prediction mode to reconstruct a current picture.

Figure 2:
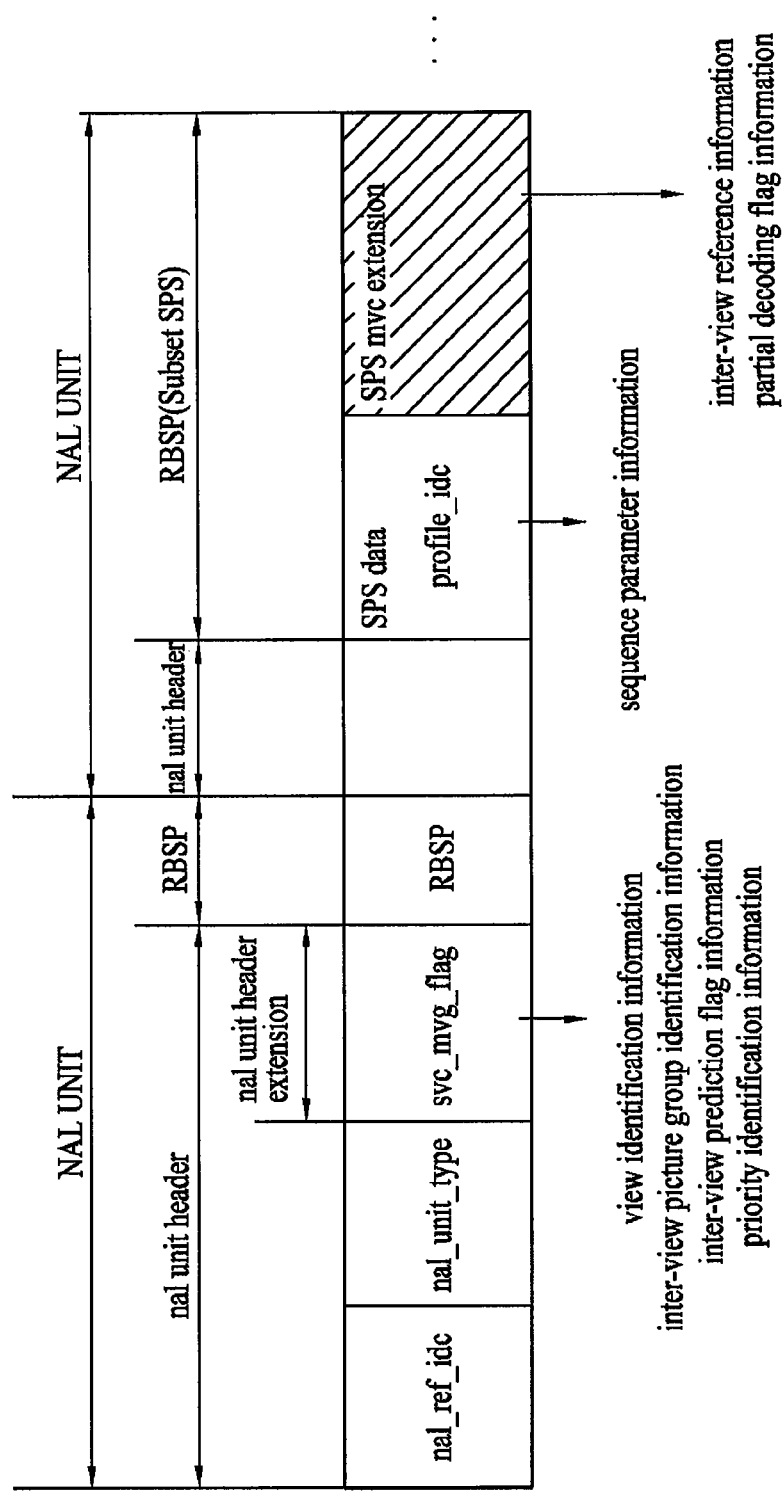
FIG. 2 is a diagram of configuration informations on a multi-view sequence that can be added to a multi-view sequence coded bit stream according to an embodiment of the present invention.

FIG. 2 is a diagram of configuration informations on a multi-view sequence addable to a multi-view sequence coded bit stream according to one embodiment of the present invention.

FIG. 2 shows an example of a NAL-unit configuration to which configuration informations on a multi-view sequence can be added. NAL unit can mainly include NAL unit header and RBSP (raw byte sequence payload: result data of moving picture compression). And, the NAL unit header can include identification information (nal_ref_idc) indicating whether the NAL unit includes a slice of a reference picture and information (nal_unit_type) indicating a type of the NAL unit. And, an extension area of the NAL unit header can be limitedly included. For instance, if the information indicating the type of the NAL unit is associated with scalable video coding or indicates a prefix NAL unit, the NAL unit is able to include an extension area of the NAL unit header. In particular, if the nal_unit_type=20 or 14, the NAL unit is able to include the extension area of the NAL unit header. And, configuration informations for a multi-view sequence can be added to the extension area of the NAL unit header according to flag information (svc_mvc_flag) capable of identifying whether it is MVC bit stream.

For another instance, if the information indicating the type of the NAL unit is information indicating a sequence parameter set, the RBSP can include information on the sequence parameter set. In particular, if nal_unit_type=7, the RBSP can include information on a sequence parameter set. If nal_unit_type=15, the RBSP can include information on a subset sequence parameter set. In this case, the subset sequence parameter set can include an extension area of the sequence parameter set according to profile information. For example, if profile information (profile_idc) is a profile relevant to multi-view video coding, the subset sequence parameter set can include an extension area of the sequence parameter set. The extension area of the sequence parameter set can include inter-view reference information indicating inter-view dependency.

Various configuration informations on a multi-view sequence, e.g., configuration informations that can be included in an extension area of NAL unit header or configuration informations that can be included in an extension area of a sequence parameter set are explained in detail as follows.

First of all, view identification information means information for discriminating a picture in a current view from a picture in a different view. In coding a video sequence signal, POC (picture order count) and 'frame_num' are used to identify each picture. In case of a multi-view video sequence, inter-view prediction is carried out. Therefore, identification information to discriminate a picture in a present view from a picture in another view is needed. Thus, it is necessary to define view identification information for identifying a view of a picture. The view identification information can be obtained from a header area of a video signal. For instance, the header area can be a NAL header area, an extension area of a NAL header, or a slice header area. Information on a picture in a view different from that of a current picture is obtained using the view identification information and it is able to decode the video signal using the information on the picture in the different view.

The view identification information is applicable to an overall encoding/decoding process of the video signal. For instance, view identification information can be used to indicate inter-view dependency. Count information of reference picture, view identification information of an inter-view reference picture and the like may be needed to indicate the inter-view dependency. Like the count information of the inter-view reference picture and the view identification information of the inter-view reference picture, informations used to indicate the inter-view dependency are called inter-view reference information. In this case, the view identification information can be used to indicate the view identification information of the inter-view reference picture. The inter-view reference picture may mean a reference picture used in performing inter-view prediction on a current picture. And, the view identification information can be intactly applied to multi-view video coding using 'frame_num' that considers a view instead of considering a specific view identifier.

Inter-view picture group identification information means information capable of identifying whether a coded picture of a current NAL unit is an inter-view picture group. In this case, the inter-view picture group means a coded picture that only refers to a slice that all slices exist in a frame on a same time zone. For instance, it means a coded picture that refers to a slice in a different view only but does not refer to a slice in a current view. In decoding a multi-view sequence, an inter-view random access may be possible. For inter-view prediction, inter-view reference information is necessary. In obtaining the inter-view reference information, inter-view picture group identification information is usable. For instance, if a current picture corresponds to an inter-view picture group, inter-view reference information on the inter-view picture group can be obtained. If a current picture corresponds to a non-inter-view picture group, inter-view reference information on the non-inter-view picture group can be obtained. This will be explained in detail with reference to FIG. 3 later.

Thus, in case that inter-view reference information is obtained based on inter-view picture group identification information, it is able to perform inter-view random access more efficiently. This is because inter-view reference relation between pictures in an inter-view picture group can differ from that in a non-inter-view picture group. And, in case of an inter-view picture group, pictures in a plurality of views can be referred to. For instance, a picture of a virtual view is generated from pictures in a plurality of views and it is then able to predict a current picture using the picture of the virtual view. Alternatively, it is able to predict a current picture by referring to a plurality of pictures in a plurality of views.

In constructing a reference picture list, the inter-view picture group identification information can be used. In this case, the reference picture list can include a reference picture list for inter-view prediction. And, the reference picture list for the inter-view prediction can be added to the reference picture list. For instance, in case of initializing a reference picture list or modifying the reference picture list, the inter-view picture group identification information can be used. And, it can be also used to manage the added reference pictures for the inter-view prediction. For instance, by dividing the reference pictures into an inter-view picture group and a non-inter-view picture group, it is able to make a mark indicating that reference pictures failing to be used in performing inter-view prediction shall not be used. And, the inter-view picture group identification information is applicable to a hypothetical reference decoder.

Inter-view prediction flag information means information indicating whether a coded picture of a current NAL unit is used for inter-view prediction. The inter-view prediction flag information is usable for a part where temporal prediction or inter-view prediction is performed. In this case, identification information indicating whether NAL unit includes a slice of a reference picture can be used together. For instance, although a current NAL unit fails to include a slice of a reference picture according to the identification information, if it is used for inter-view prediction, the current NAL unit can be a reference picture used for inter-view prediction only. According to the identification information, if a current NAL unit includes a slice of a reference picture and used for inter-view prediction, the current NAL unit can be used for temporal prediction and inter-view prediction. If NAL unit fails to include a slice of a reference picture according to the identification information, it can be stored in a decoded picture buffer. This is because, in case that a coded picture of a current NAL unit is used for inter-view prediction according to the inter-view prediction flag information, it needs to be stored.

Aside from a case of using both of the flag information and the identification information together, one identification information can indicate whether a coded picture of a current NAL unit is used for temporal prediction or/and inter-view prediction.

And, the inter-view prediction flag information can be used for a single loop decoding process. In case that a coded picture of a current NAL unit is not used for inter-view prediction according to the inter-view prediction flag information, decoding can be performed in part. For instance, intra-macroblock is completely decoded, whereas residual information of inter-macroblock is decoded only. Hence, it is able to reduce complexity of a decoder. This can be efficient if it is unnecessary to reconstruct a sequence by specifically performing motion compensation in different views when a user is looking at a view in a specific view only without viewing a sequence in entire views.

Figure 3:
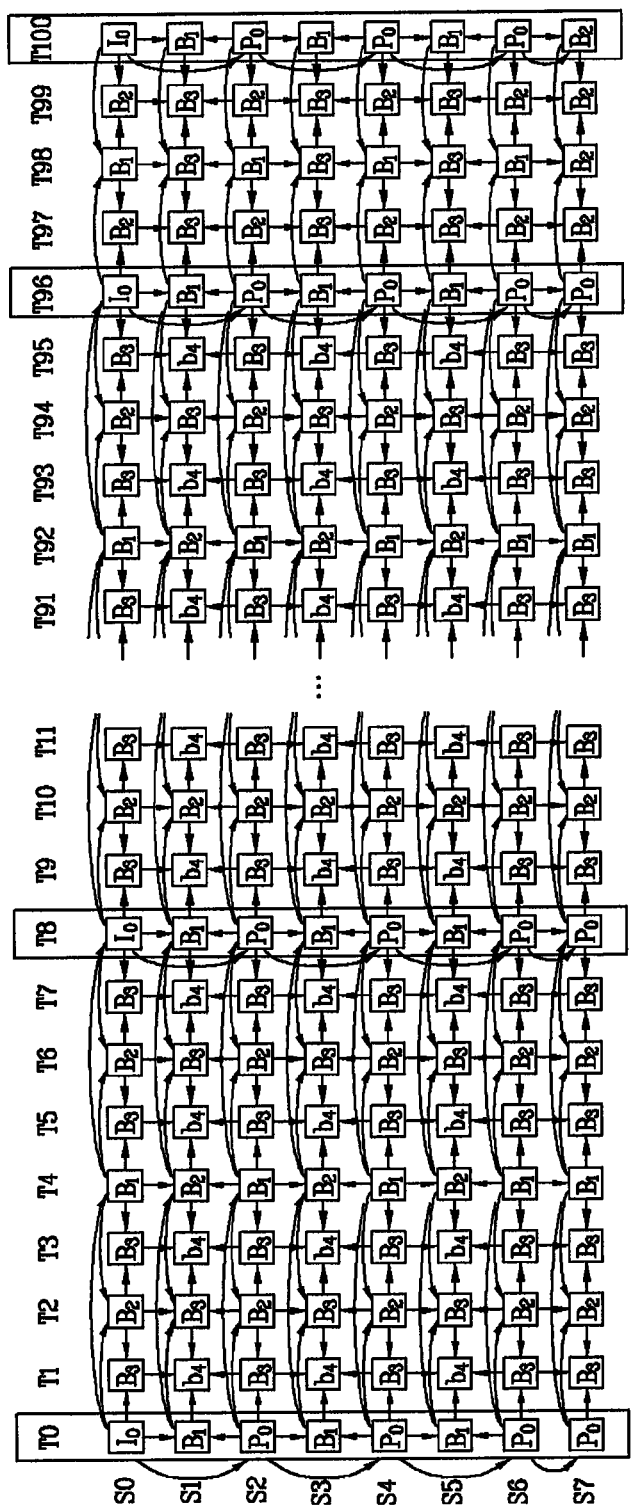
FIG. 3 is a diagram of an overall prediction structure of a multi-view sequence signal according to an embodiment of the present invention to explain a concept of an inter-view picture group.

The diagram shown in FIG. 3 is used to explain one embodiment of the present invention.

For instance, a coding order may correspond to S0, S1 and S1 in considering a portion of the diagram shown in FIG. 3. Assume that a picture to be currently coded is a picture $B_3$ on a time zone T2 in a view S1. In this case, a picture $B_2$ on the time zone T2 in a view S0 and a picture $B_2$ on the time zone T2 in a view S2 can be used for inter-view prediction. If the picture $B_2$ on the time zone T2 in the view S0 is used for the inter-view prediction, the inter-view prediction flag information can be set to 1. If the picture $B_2$ on the time zone T2 in the view S0 is not used for the inter-view prediction, the flag information can be set to 0. In this case, if inter-view prediction flag information of all slices in the view S0 is 0, it may be unnecessary to decode the entire slices in the view S0. Hence, coding efficiency can be enhanced.

For another instance, if inter-view prediction flag information of all slices in the view S0 is not 0, i.e., if at least one is set to 1, decoding is mandatory even if a slice is set to 0. Since the picture $B_2$ on the time zone T2 in the view S0 is not used for decoding of a current picture, assuming that decoding is not executed by setting the inter-view prediction information to 0, it is unable to reconstruct a picture $B_3$ on the time zone T1 in the view S0, which uses the picture $B_2$ on the time zone T2 in the view S0, and a picture $B_3$ on a time zone T3 in the view S0 in case of decoding slices in the view S0. Hence, they should be reconstructed regardless of the inter-view prediction flag information.

For further instance, the inter-view prediction flag information is usable for a decoded picture buffer (DPB). If the inter-view prediction flag information is not provided, the picture $B_2$ on the time zone T2 in the view S0 should be unconditionally stored in the decoded picture buffer. Yet, if it is able to know that the inter-view prediction flag information is 0, the picture $B_2$ on the time zone T2 in the view S0 may not be stored in the decoded picture buffer. Hence, it is able to save a memory of the decoded picture buffer.

Temporal level information means information on a hierarchical structure to provide temporal scalability from a video signal. Though the temporal level information, it is able to provide a user with a sequence on various time zones.

Priority identification information means information capable of identifying a priority of NAL unit. It is able to provide view scalability using the priority identification information. For example, it is able to define view level information using the priority identification information. In this case, view level information means information on a hierarchical structure for providing view scalability from a video signal. In a multi-view video sequence, it is necessary to define a level for a time and a level for a view to provide a user with various temporal and view sequences. In case of defining the above level information, it is able to use temporal scalability and view scalability. Hence, a user is able to view a sequence at a specific time and view only or a sequence according to another condition for restriction only. The level information can be set differently in various ways according to its referential condition. For instance, the level information can be set different according to camera location or camera alignment. And, the level information can be determined by considering view dependency. For instance, a level for a view having an inter-view picture group of I picture is set to 0, a level for a view having an inter-view picture group of P picture is set to 1, and a level for a view having an inter-view picture group of picture-B is set to 2. Thus, the level value can be assigned to the priority identification information. Moreover, the level information can be randomly set without being based on a special reference.

FIG. 3 is a diagram of an overall prediction structure of a multi-view sequence signal according to one embodiment of the present invention to explain a concept of an inter-view picture group.

Referring to FIG. 3, T0 to T100 on a horizontal axis indicate frames according to time and S0 to S7 on a vertical axis indicate frames according to view. For instance, pictures at T0 mean sequences captured by different cameras on the same time zone T0, while pictures at S0 mean sequences captured by a single camera on different time zones. And, arrows in the drawing indicate predicted directions and orders of the respective pictures. For instance, a picture P0 in a view S2 on a time zone T0 is a picture predicted from I0, which becomes a reference picture of a picture P0 in a view S4 on the time zone T0. And, it becomes a reference picture of pictures B1 and B2 on time zones T4 and T2 in the view S2, respectively.

For a multi-view sequence decoding process, an inter-view random access may be required. So, an access to a random view should be possible by minimizing the decoding effort. In this case, a concept of an inter-view picture group may be needed to perform an efficient access. The definition of the inter-view picture group was mentioned in FIG. 2. For instance, in FIG. 3, if a picture I0 in a view S0 on a time zone T0 corresponds to an inter-view picture group, all pictures in different views on the same time zone, i.e., the time zone T0 can correspond to the inter-view picture group. For another instance, if a picture I0 in a view S0 on a time zone T8 corresponds to an inter-view picture group, all pictures in different views on the same time zone, i.e., the time zone T8 can correspond to the inter-view picture group. Likewise, all pictures in T16, ..., T96, and T100 become an example of the inter-view picture group as well.

According to another embodiment, in an overall prediction structure of MVC, GOP can start from an I picture. And, the I picture is compatible with H.264/AVC. So, all inter-view picture groups compatible with H.264/AVC can become the I picture. Yet, in case of replacing the I-pictures by P picture, more efficient coding is possible. In particular, more efficient coding is enabled using a prediction structure that GOP is made to start from P picture compatible with H.264/AVC. In this case, if the inter-view picture group is re-defined, it becomes a coded picture capable of referring to a slice on a different time zone in a same view as well as a slice that all slices exist in a frame on a same time zone. Yet, the case of referring to a slice on a different time zone in a same view may be limited to an inter-view picture group compatible with H.264/AVC only.

After the inter-view picture group has been decoded, all of the sequentially coded pictures are decoded from the picture decoded ahead of the inter-view picture group in an output order without inter-prediction.

Therefore, considering the overall coding structure of the multi-view video sequence shown in FIG. 3, since inter-view dependency of an inter-view picture group differs from that of a non-inter-view picture group, it is necessary to discriminate the inter-view picture group and the non-inter-view picture group from each other according to the inter-view picture group identification information.

The inter-view reference information means information indicating what kind of structure is used to predict inter-view sequences. This can be obtained from a data area of a video signal. For instance, it can be obtained from a sequence parameter set area. And, the inter-view reference information can be obtained using the number of reference pictures and view information of the reference pictures. For instance, after a total number of views has been obtained, it is able to obtain view identification information for identifying each view based on the total number of the views. And, number information of inter-view reference pictures, which indicates a number of reference pictures for a reference direction of each view, can be obtained. According to the number information of the inter-view reference pictures, it is able to obtain view identification information of each inter-view reference picture.

Through this method, the inter-view reference information can be obtained. And, the inter-view reference information can be obtained in a manner of being categorized into a case of an inter-view picture group and a case of a non-inter-view picture group. This can be known using inter-view picture group identification information indicating whether a coded slice in a current NAL corresponds to an inter-view picture group. The inter-view picture group identification information can be obtained from an extension area of NAL header or a slice layer area.

Moreover, the inter-view reference information obtained according to the inter-view picture group identification information is usable for construction, management and the like of a reference picture list.

Various embodiments for providing a method of decoding a video signal efficiently are described as follows.

Figure 4:
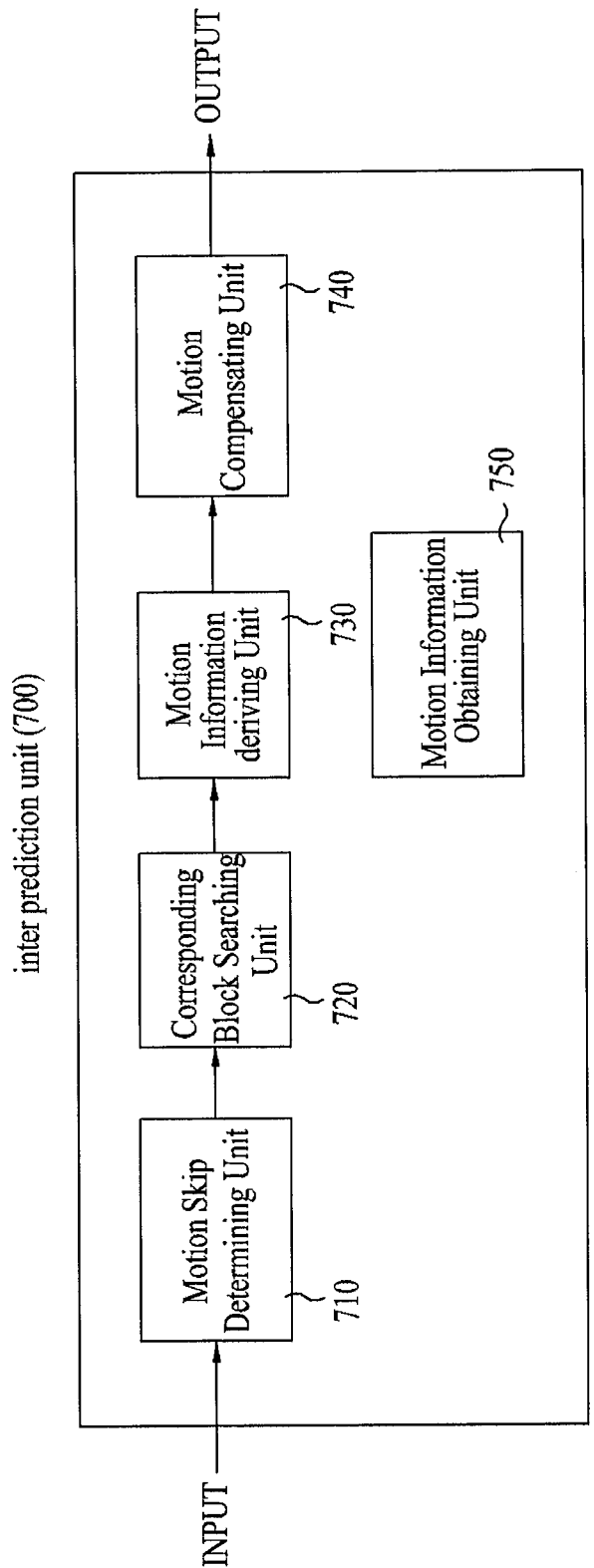
FIG. 4 is a diagram for explaining a method of performing motion compensation in accordance with a presence or non-presence of motion skip according to an embodiment of the present invention.

FIG. 4 is a diagram for explaining a method of performing motion compensation in accordance with a presence or non-presence of motion skip according to an embodiment of the present invention.

The inter-prediction unit 700 compensates for a motion of a current block using informations transmitted from the entropy decoding unit 200. Motion vectors of blocks neighbor to the current block are extracted from a video signal and a motion vector of the current block are then obtained. And, the motion of the current block is compensated using the obtained motion vector predicted value and a differential vector extracted from the video signal. And, it is able to perform the motion compensation using one reference picture or a plurality of pictures. In multi-view video coding, in case that a current picture refers to pictures in different views, it is able to perform motion compensation using information on the inter-view prediction reference picture list stored in the decoded picture buffer unit 600. And, it is also able to perform motion compensation using view information for identifying a view of the corresponding picture.

And, a direct prediction mode is an encoding mode for predicting motion information for a current block from motion information for an encoded block. Since this method is able to save a count of bits required for decoding the motion information, compression efficiency is enhanced. For instance, a temporal direct mode predicts motion information for a current block using motion information correlation in a temporal direction. The temporal direct mode is effective when a speed of the motion in a sequence containing different motions is constant. In case that the temporal direct mode is used for multi-view video coding, inter-view motion vector should be taken into consideration.

For another example of the direct prediction mode, a spatial direct mode predicts motion information of a current block using motion information correlation in a spatial direction. The spatial direct mode is effective when a speed of motion varies in a sequence containing the same motions.

Within a reference picture having a smallest reference number in a reverse direction reference picture list (List 1) of a current picture, it is able to predict motion information of the current picture using motion information of a block co-located with the current block. Yet, in multi-view video coding, the reference picture may exist in a view different from that of the current picture. In this case, various embodiments are usable in applying the spatial direct mode.

Examples for performing motion compensation according to a presence or non-presence of motion skip according to an embodiment of the present invention are explained as follows.

The motion skip determining unit 710 determines whether to derive motion information of a current block or not. For instance, it is able to use flag information indicating whether to perform a motion skip (hereinafter named motion skip flag information). The motion skip flag information can be set hierarchical. For instance, the motion skip flag information can be set on at least one selected from the group consisting of a sequence level, a view level, a GOP (group of picture) level, a picture level, a slice level, a macroblock level and a sub-block level.

If the motion skip flag information is 1, the motion skip is performed. Namely, motion information of the current block can be derived from motion information of the reference block. On the other hand, if the motion skip flag information is 0, the motion skip determining unit 710 does not perform the motion skip but obtains transmitted motion information. In this case, the motion information can include a motion vector, a reference index, a block type and the like.

In particular, it is able to obtain first flag information (motion_skip_enable_flag) from a slice header. In this case, the first flag information can indicate whether a current slice uses a motion skip or not. For instance, if the first flag information is 1, a current slice uses a motion skip. If the flag information is 0, a current slice does not use a motion skip. If the first flag information does not exist, the first flag information can be derived into 0.

Moreover, it is able to obtain second flag information (motion_skip_flag) from a macroblock layer. In this case, the second flag information can indicate whether motion information of a current block is derived. For instance, in case that a motion skip is used in a current slice according to the first flag information, it is able to re-obtain second flag information indicating whether to use a motion skip in a macroblock layer. For instance, if the second flag information is 1, motion information of a current macroblock can be derived from a reference block in a different view. If the second flag information is 0, motion information of a current block is not derived from a reference block in a different view. If the second flag information does not exist, the second flag information can be derived from 0. Thus, motion skip flag information can hierarchically control whether to perform a motion skip in a manner of being hierarchically set on at least two levels. Alternatively, the motion skip flag information can be independently set on a single level.

For another embodiment, predetermined requirements may be necessary to obtain motion skip flag information.

For first example, motion skip flag information can be obtained based on inter-view picture group identification information. As mentioned in the foregoing description, the inter-view picture group identification information is explained in detail with reference to FIG. 2. In this case, the motion skip flag information can contain the first flag information and/or the second flag information. Alternatively, the motion skip flag information can contain another flag information defined in a different layer. If a current picture corresponds to a non-inter-view picture group according to the inter-view picture group identification information, the motion skip flag information can be obtained.

For second example, motion skip flag information can be obtained based on inter-view reference information. As mentioned in the foregoing description, the inter-view reference information is explained in detail with reference to FIG. 2. In this case, the motion skip flag information can contain the first flag information and/or the second flag information. For instance, the motion skip flag information can be obtained in case that inter-view reference relation exists. The inter-view reference relation may mean an inter-view reference relation of a non-inter-view picture group. In detail, it is able to obtain the motion skip flag information based on information on the number of inter-view reference pictures of a non-inter-view picture group. If the number of inter-view reference pictures for a L1 direction of a non-inter-view picture group is greater than 0, the motion skip flag information can be obtained. If the number of inter-view reference pictures for a L1 direction of a non-inter-view picture group is greater than 0, the motion skip flag information can be obtained.

The motion skip flag information can be set to be obtained if an inter-view reference relation of an inter-view picture group exists. Alternatively, it is able to set the motion skip flag information to be obtained regardless of a presence or non-presence of an inter-view picture group.

For third example, motion skip flag information can be obtained based on inter-view picture group information and inter-view reference information. In this case, the motion skip flag information can contain the first flag information and/or the second flag information. For instance, if a current picture is not an inter-view picture group and if the number of inter-view reference pictures for a L0 and/or L1 direction of a non-inter-view picture group is greater than 0, it is able to obtain motion skip flag information.

The motion skip flag information can be obtained based on another motion skip flag information. For instance, the second flag information can be obtained based on the first flag information. Namely, if a current slice performs a motion skip according to the first flag information (motion_skip_enable_flag), it is able to obtain the second flag information (motion_skip_flag). Alternatively, it is able to obtain the second flag information if a current picture is not an inter-view picture and if a current slice performs a motion skip.

For fourth example, motion skip flag information can be obtained based on whether a current view is a base view. In this case, a base view can mean a view that can be coded independent from other views. Alternatively, a base view may mean at least one view for compatibility with a conventional decoder (e.g., H.264/AVC, MPEG-2, MPEG-4, etc.). The base view can become a base of coding in multi-views. Alternatively, the base view may correspond to a reference view for prediction of a different view. A sequence corresponding to the base view is encoded by sequence codec scheme (MPEG-2, MPEG-4, H.26L series, etc.) to be formed as an independent bitstream. The sequence corresponding to the base view may or may not be compatible with H.264/AVC. Yet, a sequence in a view compatible with H.264/AVC becomes a base view. For instance, if a current slice corresponds to a base view, motion skip flag information of a current slice may not be parsed. In particular, motion skip flag information of a current slice can be obtained if the current slice does not correspond to a base view.

Meanwhile, the reference view can be defined in various ways. Firstly, it is able to use flag information indicating whether a target to be currently coded corresponds to a base view. For instance, of base_view=1, it may mean that a current view corresponds to a base view. If base_view=0, it may mean that a current view does not correspond to a base view. Secondly, it is able to define a base view using level information. For instance, in case that an inter-view picture group is intra-coded, a view including the inter-view picture group can be set to a lowest level. And, a view having a lowest level can be defined as a base view. Thirdly, it is able to define a base view using priority identification information. The priority identification information is explained in the foregoing description. For instance, a view, in which the priority identification information has a lowest value, can be defined as a base view.

For fifth example, motion skip flag information can be obtained based on a partial decoding flag. In this case, if a current picture corresponds to a non-inter-view picture group, the partial decoding flag indicates whether the current picture can be decoded without fully reconstructing an inter-view reference picture. For instance, if the partial decoding flag is 1, a current picture can be decoded using a partially decoded inter-view reference picture. In this case, partial decoding may mean a case that residual information is decoded only.

Thus, in order to obtain the motion skip flag, the above embodiments are applicable as independent requirements or combinations thereof. Moreover, the motion skip flag can be obtained without any requirements. For instance, the motion skip flag can be obtained from a sequence parameter set, a picture, a slice header, a macroblock layer and/or one of extension areas thereof.

In case that the motion skip is performed by the motion skip determining unit 710, the corresponding block searching unit 720 searches for a corresponding block. The motion information deriving unit 730 is able to derive motion information of the current block using the motion information of the corresponding blocks. The motion compensating unit 740 then performs motion compensation using the derived motion information. Meanwhile, if the motion skip is not performed by the motion skip determining unit 710, the motion information obtaining unit 750 obtains the transmitted motion information. The motion compensating unit 740 then performs the motion compensation using the obtained motion information. Detailed processes for performing the motion compensation are explained as follows.

Figure 5:
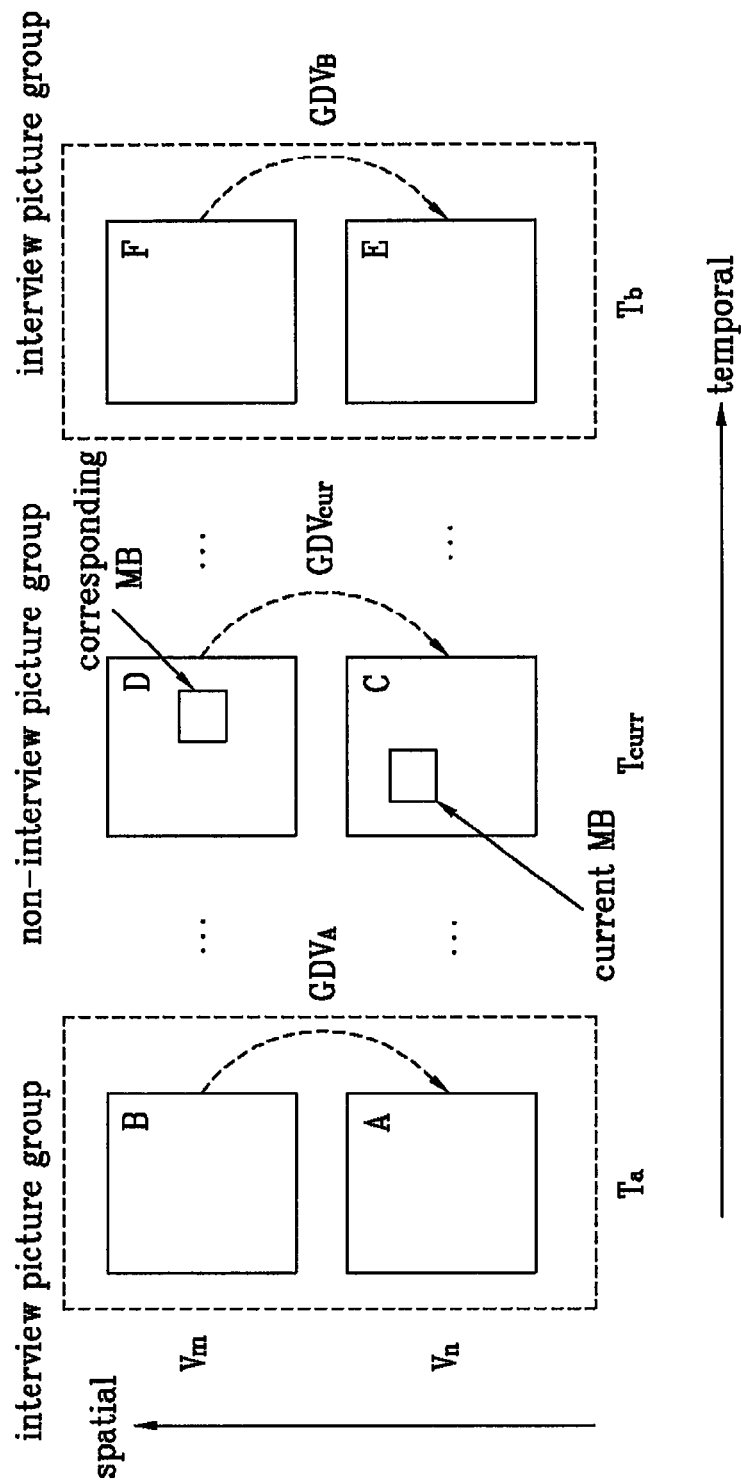
FIG. 5 is a block diagram to explain a method of searching for a corresponding block according to an embodiment of the present invention.

FIG. 5 is a block diagram to explain a method of searching for a corresponding block according to an embodiment of the present invention.

According to an embodiment of the present invention, it is able to predict coding information on a second domain of a current block using coding information on a second domain of a first domain block. In this case, it is able to obtain block information as the coding information together with the motion information. For instance, in a skip mode, information of a block coded ahead of a current block is utilized for information of a current block. In applying the skip mode, information existing on different domains is usable. This is explained with reference to detailed examples as follows.

For first example, it is able to assume that relative motion relations of objects (or backgrounds) within two different view sequences in a time Ta are similarly maintained in a time Tcurr sufficiently close to the time Ta. In this case, view-directional coding information in the time Ta has high correlation with view-directional coding information in the time Tcurr. If motion information of a corresponding block on a different time zone in a same view is used intact, it is able to obtain high coding efficiency. And, it is able to use motion skip information indicating whether this method is used or not. In case that a motion skip is performed according to the motion skip information, it is able to predict such motion information as a block type, a motion vector and a reference index from a corresponding block of a current block. Hence, it is able to reduce a bit amount required for coding the motion information.

For second example, like the former example, the same method is usable in a manner of changing the first and second domains which are the algorithm applied axes. In particular, it is highly probable that an object (or a background) within a view Vn in a same time Ta and an object (or a background) within a view Vm neighboring to the view Vn may have similar motion information. In this case, if motion information of a corresponding block on a same time zone in a different view is brought intact and then used, it is able to obtain high coding efficiency. And, it is able to use motion skip information indicating whether such a method is used or not.

Using motion information of a block neighboring to a current block, an encoder predicts motion information of the current block and then transmits a difference value between a real motion vector and a predicted motion vector. Likewise, a decoder determines whether a reference index of a picture referred to by a current macroblock is identical to that of a picture referred to by a neighbor block and then correspondingly obtains a motion vector predicted value. For instance, in case that there exists a single block having a same reference index of a current macroblock among the neighbor blocks, a motion vector of the neighbor block is used as it is. In other cases, a median value of motion vectors of the neighbor blocks is used.

In multi-view video coding, a reference picture can exist not only on a time axis but also on a view axis. Due to this characteristic, if a reference picture index of a current block differs from that of a neighbor block, it is highly probable that the motion vectors will have no correlation in-between. If so, accuracy of a motion vector predicted value is considerably lowered. Hence, a new motion vector predicting method using inter-view correlation according to one embodiment of the present invention is proposed.

For instance, a motion vector generated between views may be dependent on depth of each object. If a depth of sequence has no considerable change spatially and if a motion of a sequence according to a variation of a time axis is not considerable, the depth itself at a position of each macroblock will not be considerably changed. In this case, the depth may mean information capable of indicating an inter-view disparity difference. Since influence of global motion vectors basically exists between cameras, although a depth is changed slightly, if a global motion vector is sufficiently larger than the depth change, using the global motion vector can be more efficient than using a time-directional motion vector of a neighbor block having no correlation.

In this case, the global motion vector may mean a motion vector applicable to a predetermined area in common. For instance, if a motion vector corresponds to a partial area (e.g., macroblock, block, pixel, etc.), a global motion vector or a global disparity vector is a motion vector corresponding to a whole area including the partial area. For instance, the whole area may correspond to a single slice, a single picture or a whole sequence. And, the whole area may correspond to at least one object within a picture, a background or a predetermined area. The global motion vector can be a value of a pixel unit or ¼ pixel unit or a value of 4×4 unit, 8×8 unit or macroblock unit.

According to an embodiment of the present invention, it is able to predict a motion vector of a current block using inter-view motion information of a co-located block. In this case, the co-located block may be a block adjacent to a current block existing in a same picture or corresponds to a block co-located with the current block included in a different picture. For instance, in case of a different picture in a different view, it can be a spatial co-located block. In case of a different picture in a same view, it can be a temporal co-located block.

In a multi-view video coding structure, a random access can be performed by leaving pictures for prediction in a view direction with a predetermined time interval only. Thus, if two pictures for predicting motion information in view direction only are decoded, it is able to apply a new motion vector predicting method to the pictures temporally existing between the two decoded pictures. For instance, it is able to obtain a view-directional motion vector from a picture for prediction in view direction only and this can be stored by 4×4 block unit. In case that an illumination difference is considerable in performing view-directional prediction only, it may frequently happen that coding is carried out by intra-prediction. In this case, a motion vector can be set to 0. Yet, if coding is mainly carried out by intra-prediction use to a considerable illumination difference, many macroblocks, of which information on a motion vector in view direction is unknown, are generated. To compensate for this, in case of intra-prediction, it is able to calculate a virtual inter-view motion vector using a motion vector of a neighbor block. And, it is able to set the virtual inter-view motion vector to a motion vector of a block coded by the intra-prediction.

After the inter-view motion information has been obtained from the two decoded pictures, it is able to code hierarchical B-pictures existing between the decoded pictures. In this case, the two decoded pictures may be an inter-view picture group. In this case, the inter-view picture group means a coded picture that only refers to a slice that all slices are in a frame on a same time zone. For instance, it means a coded picture that refers to a slice in a different view only without referring to a slice in a current view.

Meanwhile, in a method of predicting a motion vector of a current block, a corresponding block existing in a view different from a view of a current block and coding information of the current block can be then predicted using coding information of the corresponding block. First of all, a method of finding a corresponding block existing in a view different from that of a current block is explained as follows.

For instance, a corresponding block may be a block indicated by a view-directional motion vector of a current block. In this case, the view-directional motion vector means a vector indicating inter-view disparity difference or a global motion vector. In this case, the meaning of the global motion vector has been explained in the foregoing description. And, the global motion vector may indicate a corresponding macroblock position of a neighboring view on the same temporal instant of a current block. Referring to FIG. 5, pictures A and B exist in time Ta, pictures C and D exist in time Tcurr, and pictures E and F exist in time Tb. In this case, the pictures A and B in the time Ta and the pictures in the time Tb may be an inter-view picture group. And, the pictures C and D in the time Tcurr may be a non-inter-view picture group. The pictures A, C and E exist in the same view Vn. And, the pictures B, D and F exist in the same vie Vm. The picture C is a picture to be currently decoded. And, a corresponding macroblock (MB) of the picture D is a block indicated by a global motion vector GDVcurr of a current block (current MB) in view direction. The global motion vector can be obtained by a macroblock unit between a current picture and a picture in a neighboring view. In this case, information on the neighboring view can be known by information indicating inter-view reference relation.

The information indicating the inter-view reference relation is the information indicating what kind of structure is used to predict inter-view sequences. This can be obtained from a data area of a video signal. For instance, it can be obtained from a sequence parameter set for example. And, the inter-view reference information can be recognized using the number information of reference pictures and the view information of the reference pictures. For instance, after the total number of views has been obtained, it is able to recognize view information for discriminating each view based on the total number of views. And, it is able to obtain the number of reference pictures for a reference direction for each view. According to the number of reference pictures, it is able to obtain view information of each reference picture. Through this process, the inter-view reference information can be obtained. And, the inter-view reference information can be recognized in a manner of being divided into a case of an inter-view picture group and a case of a non-inter-view picture group. This can be known using inter-view picture group identification information indicating whether a coded slice in a current NAL corresponds to an inter-view picture group.

As embodiments of the present invention, predetermined requirements may be necessary to obtain a motion vector in a view direction for finding a corresponding block. For instance, requirements for obtaining a global motion vector are explained as follows.

For first example, a global motion vector can be obtained based on inter-view picture group identification information. The inter-view picture group identification information and the global motion vector are explained in the foregoing description. For instance, in case that a current picture corresponds to an inter-view picture group according to the inter-view picture group identification information, it is able to obtain the global motion vector. In this case, the global motion vector can include a global motion vector in a L0 direction and/or a global motion vector in a L1 direction. Alternatively, in case that a current picture corresponds to a non-inter-view picture group according to the inter-view picture group identification information, it is able to set the global motion vector to be obtained. Alternatively, it is able to set the global motion vector to be obtained regardless of a presence or non-presence of an inter-view picture group.

For second example, a global motion vector can be obtained based on a slice type. For instance, if a slice type of a current macroblock is P-slice or B-slice, the global motion vector can be obtained. In case that a slice type of a current block is P-slice, it is able to obtain a global motion vector in a L0 direction. In case that a slice type of a current block is B-slice, it is able to obtain a global motion vector in a L0 direction and a global motion vector in a L1 direction.

For third example, a global motion vector can be obtained based on inter-view reference information. The inter-view reference information is explained in detail with reference to FIG. 2. For instance, the global motion vector can be obtained if there exists an inter-view reference relation. In this case, the inter-view reference relation may mean an inter-view reference relation of a non-inter-view picture group. For detailed instance, it is able to obtain the global motion vector based on information on the number of inter-view reference pictures of a non-inter-view picture group. It is able to obtain global motion vectors in the L0 direction as many as the number of inter-view reference pictures in the L0 direction of a non-inter-view picture group. Alternatively, it is able to obtain global motion vectors in the L1 direction as many as the number of inter-view reference pictures in the L1 direction of a non-inter-view picture group.

For fourth example, a global motion vector can be obtained based on whether a current view is a base view. In this case, a base view can mean a view that can be coded independent from other views. Alternatively, a base view may mean at least one view for compatibility with a conventional decoder (e.g., H.264/AVC, MPEG-2, MPEG-4, etc.). The base view can become a base of coding in multi-views. Alternatively, the base view may correspond to a reference view for prediction of a different view. A sequence corresponding to the base view is encoded by sequence codec scheme (MPEG-2, MPEG-4, H.26L series, etc.) to be formed as an independent bitstream. The sequence corresponding to the base view may or may not be compatible with H.264/AVC. Yet, a sequence in a view compatible with H.264/AVC becomes a base view. For instance, if a current slice corresponds to a base view, a global motion vector of a current slice may not be parsed. In particular, a global motion vector of a current slice can be obtained if the current slice does not correspond to a base view.

Meanwhile, the reference view can be defined in various ways. Firstly, it is able to use flag information indicating whether a target to be currently coded corresponds to a base view. For instance, of base_view=1, it may mean that a current view corresponds to a base view. If base_view=0, it may mean that a current view does not correspond to a base view. Secondly, it is able to define a base view using level information. For instance, in case that an inter-view picture group is intra-coded, a view including the inter-view picture group can be set to a lowest level. And, a view having a lowest level can be defined as a base view. Thirdly, it is able to define a base view using priority identification information. The priority identification information is explained in the foregoing description. For instance, a view, in which the priority identification information has a lowest value, can be defined as a base view.

Thus, in order to obtain the global motion vector, the above examples are applicable as independent requirements or any combination thereof.

According to another embodiment of the present invention, if a current picture corresponds to a non-inter-view picture group, a method of deriving a global motion vector of the current picture is explained as follows.

First of all, in case that a current picture corresponds to a non-inter-view picture group, a global motion vector of the current picture can be derived from a global motion vector of an inter-view picture group. For instance, a global motion vector of the current picture can be derived using a global motion vector of a coded inter-view picture group prior to the current picture in coding order. In this case, the inter-view picture group may be the recently coded inter-view picture group among the inter-view picture groups coded prior to the current picture. Yet, if the recently coded inter-view picture group is not available, it is able to use a global motion vector of an inter-view picture group coded prior to the recently coded inter-view picture group. For detailed instance, assume that the coding order of pictures A, C and E in a view Vn in FIG. 5 corresponds to order of A, E and C. And, assume that the pictures A and E correspond to an inter-view picture group. Moreover, the picture C corresponds to a non-inter-view picture group. In this case, a global motion vector of the current picture C can be derived from a global motion vector of the picture E corresponding to a recently coded inter-view picture group. This can be represented as Formula 1.

$$GDV_{curr} = GDV_B \quad \text{[Formula 1]}$$

If the $GDV_B$ is not available, it is able to use a global motion vector of the picture A. This can be represented as Formula 2.

$$GDV_{curr} = GDV_A \quad \text{[Formula 2]}$$

And, it is able to obtain global motion vectors of the current picture as many as the number of views referred to by the current picture. In this case, the number of the referred-to views can be obtained from inter-view reference information. And, the inter-view reference information can be obtained from an extension area of a sequence parameter set. For instance, the number of the referred-to views may mean the number of inter-view reference pictures for a non-inter-view picture group. This is applicable to a List0 direction and/or a List1 direction.

The view referred to by the current picture can be obtained from the inter-view reference information. For instance, the view identification information of the reference view may mean view identification information of inter-view reference pictures for a non-inter-view picture group. This is applicable to a List0 direction and/or a List1 direction.

According to another embodiment of the present invention, if a current picture corresponds to a non-inter-view picture group, a global motion vector of the current picture can be obtained using a global motion vector of an inter-view picture group and information indicating a temporal (or spatial) distance together. For instance, referring to FIG. 5, assuming that a global motion vector of a picture A is set to GDVa and assuming that a global motion vector of a picture E is set to GDVb, a global motion vector of a current picture C corresponding to a non-inter-view picture group can be obtained using global motion vectors of pictures A and E corresponding to the inter-view picture group and temporal distance information. For instance, the temporal distance information may include POC (picture order count) indicating a picture output order. Hence, it is able to derive the global motion vector of the current picture using Formula 3.

$$GDV_{cur} = GDV_A + \left[\frac{T_{cur} - T_A}{T_B - T_A} \times (GDV_B - GDV_A)\right] \quad \text{[Formula 3]}$$

Looking into Formula 3, it is able to calculate a global motion vector of a current block using temporal distances between a current picture C and usable inter-view picture groups A and E.

Thus, it is able to find a corresponding block, which is referred to by a current block, using the obtained global motion vector. And, it is able to predict coding information of the current block using the corresponding block. Yet, accuracy of the global motion vector may be lowered according to an applied area. Therefore, it is necessary to find a corresponding block in more detail. A method of finding a corresponding block more accurately using side information is explained with reference to FIG. 6 as follows.

Figure 6:
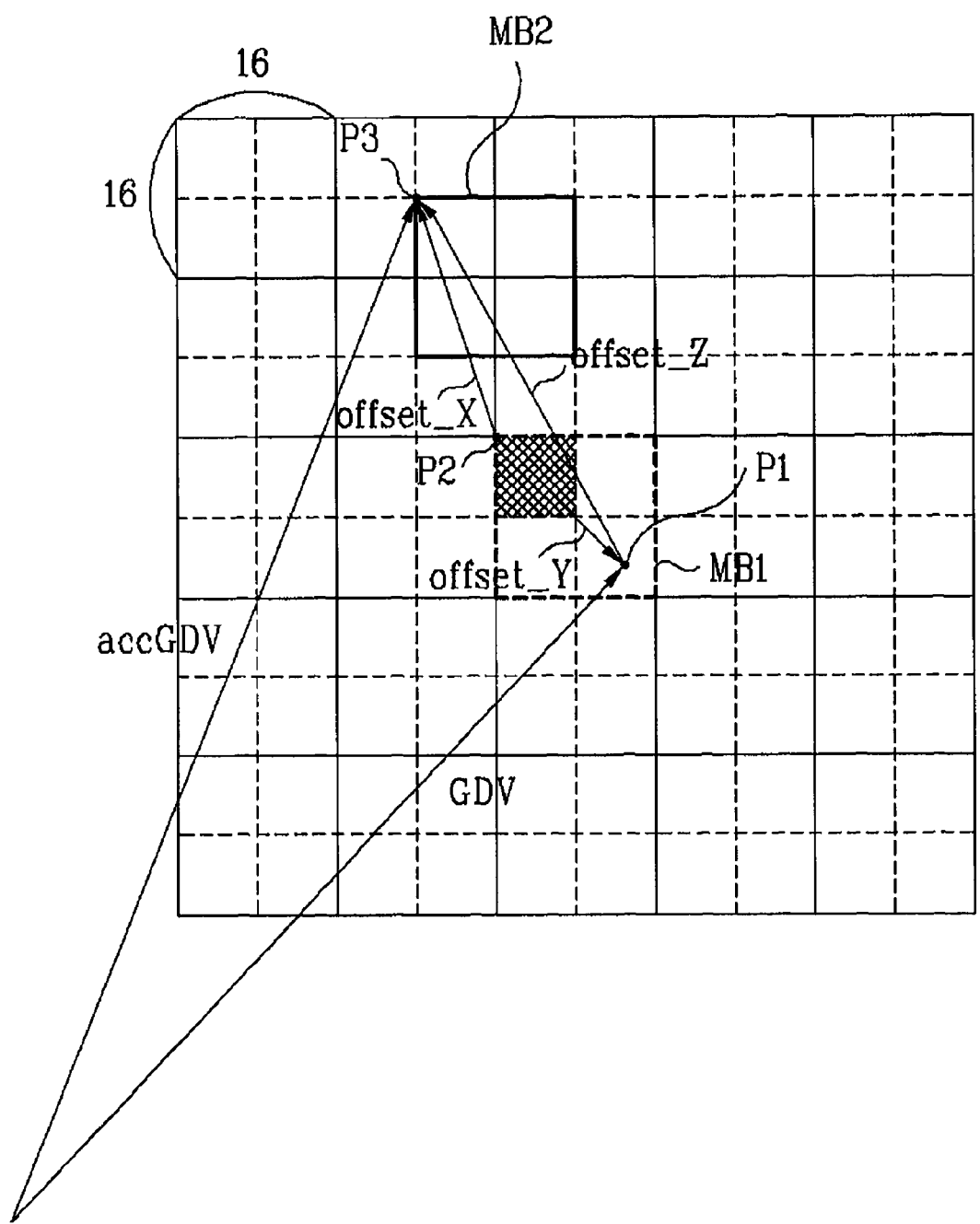
FIG. 6 is a diagram to explain a method of searching for a corresponding block using side information according to an embodiment of the present invention.

FIG. 6 is a diagram to explain a method of searching for a corresponding block using side information according to an embodiment of the present invention.

In a method of predicting a motion vector of a current block, it is able to predict coding information off the current block using coding information of a corresponding block in a manner of finding the corresponding block existing in a view different from that of the current block. The corresponding block may include a block indicated by a view-direction motion vector of the current block. And, the view-direction motion vector may mean a global motion vector. The meaning of the global motion vector is explained in the foregoing description. In this case, coding efficiency can be enhanced higher if a block most similar to the current block is found using side information.

According to an embodiment of the present invention, a method of raising accuracy of a motion vector is explained as follows. For instance, it is able to raise accuracy of a motion vector using side information. And, the side information may include offset information. For instance, the offset information can include a first offset information offset_X indicating a position difference between a corresponding block MB1 indicated by a global motion vector of a current block and a real reference block MB2 containing motion information. In this case, each of the corresponding block MB1 and the reference block MB2 may include 16×16 macroblock. And, the first offset information offset_X can be obtained from a macroblock layer in case that a motion skip is performed. In the following description, a process for deriving the motion vector indicating the reference block MB2 using the first offset information offset_X is explained.

First of all, it is able to derive a second offset information offset_Y indicating a difference between a position P1 indicated by a global motion vector of a current block and a position P2 of a macroblock MB1 including the former position P1. In this case, the second offset information offset_Y may mean a variable. For instance, the second offset information offset_Y can be derived based on a value of the position P1 indicated by the global motion vector of the current block. For detailed instance, if a remainder resulting from dividing horizontal and vertical components of the position P1 (x,y) indicated by the global motion vector of the current block by 2 is (0,0), the second offset information offset_Y is set to (0,0). If the remainder is (0,1), the second offset information offset_Y can be set to (0,1). If the remainder is (1,0), the second offset information offset_Y can be set to (1,0). If the remainder is (1,1), the second offset information offset_Y can be set to (1,1).

Using the first offset information offset_X and the second offset information offset_Y, it is able to derive a third offset information offset_Z indicating a difference between the position P1 indicated by the global motion vector of the current block and a position P3 included in the reference block MB2. This can be represented as Formula 4.

$$\text{offset}\_Z[0] = \text{offset}\_X[0] - \text{offset}\_Y[0]$$

$$\text{offset}\_Z[1] = \text{offset}\_X[1] - \text{offset}\_Y[1] \quad \text{[Formula 4]}$$

In this case, '0' and '1' may mean horizontal and vertical directions, respectively.

Meanwhile, a global motion vector GDV of the current block can be transmitted via a bitstream. Hence, it is able to derive an amended motion vector using the transmitted global motion vector GDV and the above-derived third offset information offset_Z. For instance, the amended motion vector may mean a motion vector accGDV indicating the second reference block MB2. In this case, the reference block MB2 may mean the block having an optimal rate-distortion as a result of calculating rate-distortions of all blocks by an encoder. Namely, the reference block MB2 may mean the block most similar to the current block. The amended motion vector can be derived as Formula 5.

$$accGDV[0] = GDV[0] + \text{offset}\_Z[0]$$

$$accGDV[1] = GDV[1] + \text{offset}\_Z[1] \quad \text{[Formula 5]}$$

Using the amended motion vector accGDV, it is able to derive position information of the reference block MB2. For instance, if a remainder resulting from dividing horizontal and vertical components of a position P3 (x,y) indicated by the amended motion vector is (0,0), it can be named 'mode0'. In this case, the mode0 may mean that the position of the reference block MB2 indicates a position of 8×8 block at an upper left end portion of 16×16 macroblock divided into four equal parts by 8×8 unit. If a remainder resulting from dividing horizontal and vertical components of a position P3 (x,y) indicated by the amended motion vector is (1,0), it can be named 'mode1'. In this case, the mode1 may mean that the position of the reference block MB2 indicates a position of 8×8 block at an upper right end portion of 16×16 macroblock divided into four equal parts by 8×8 unit. In the same manner, if the remainder is (0,1), it can be named 'mode2'. In the same manner, if the remainder is (1,1), it can be named 'mode3'. The mode2 indicates a position of 8×8 block at a lower left end portion. And, the mode3 indicates a position of 8×8 block at a lower right end portion.

Thus, the position information of the reference block MB2 is derived and the motion information of the current block can be then derived according to the position information of the reference block MB2. In this case, the motion information can include a motion vector, a reference index, a block type, and the like.

Figure 7:
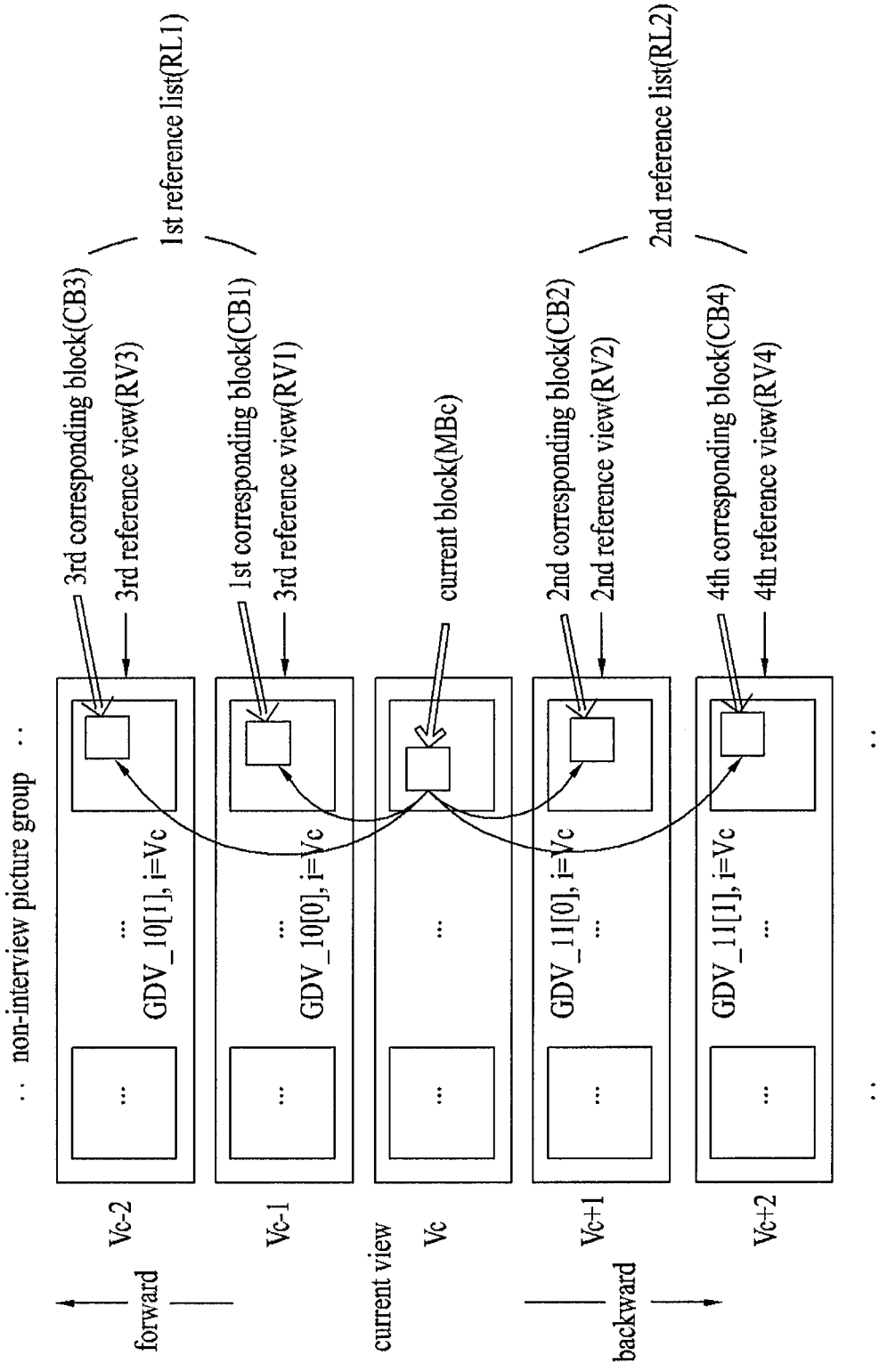
FIG. 7 is a diagram to explain a method of performing a motion skip in case that at least one reference view is usable according to an embodiment of the present invention.

FIG. 7 is a diagram to explain a method of performing a motion skip in case that at least one reference view is usable according to an embodiment of the present invention.

Information on a reference view can be explicitly transmitted via a bitstream by an encoder or can be implicitly and randomly determined by a decoder. The explicit method and the implicit method are explained in the following description.

First of all, information indicating which one of views included in a reference view list is set to a reference view, i.e., view identification information of a reference view can be explicitly transmitted. In this case, the reference view list may mean a list of reference views constructed based on inter-view reference relation (view dependency).

For instance, if it is set to check whether views from one closest to a current view can be reference views among views belonging to the reference view list, it is unnecessary to explicitly transmit view identification information of reference view. Yet, since reference view lists in L0 and L1 directions may exist in such a case, it is able to explicitly transmit flag information indicating which one of the two will be firstly checked. For instance, it is able to determine whether the reference view list in the L0 direction or the reference view list in the L1 direction is firstly checked according to the flag information.

For another instance, it is able to explicitly transmit number information of reference views to be used for motion skip. In this case, the number information of the reference views can be obtained from a sequence parameter set. And, it is able to explicitly transmit a plurality of global motion vectors having vest efficiency calculated by an encoder. In this case, a plurality of the global motion vectors can be obtained from a slice header of a non-inter-view picture group. Thus, a plurality of the transmitted global motion vectors can be sequentially applied. For instance, in case that a block indicated by a global motion vector having best efficiency is coded in an intra-mode or unusable, it is able to check a block indicated by a global motion vector having second best efficiency. And, it is able to check all blocks indicated by a plurality of explicitly transmitted global motion vectors in the same manner.

For another instance, it is able to define flag information indicating whether a motion skip mode will be applied in a sequence. For instance, if motion_skip_flag_sequence is 1, a motion skip mode is applicable in a sequence. If motion_skip_flag_sequence is 0, a motion skip mode is not applied in a sequence. If so, it is able to re-check whether a motion skip mode will be applied in a slice or on a macroblock level.

If a motion skip mode is applied in a sequence according to the flag information, it is able to define a total number of reference views that will be used in the motion skip mode. For instance, num_of_views_minus1_for_ms may mean a total number of reference views that will be used in the motion skip mode. And, the num_of_views_minus1_for_ms can be obtained from an extension area of a sequence parameter set. It is able to obtain global motion vectors amounting to the total number of the reference views. In this case, the global motion vector can be obtained from a slice header. And, the global motion vector can be obtained only if a current slice corresponds to a non-inter-view picture group. Thus, a plurality of the obtained global motion vectors can be sequentially applied in the above-explained manner.

For another instance, a global motion vector can be obtained from an extension area of a sequence parameter set based on the number of reference views. For example, the global motion vectors can be obtained by being divided into a global motion vector in L0 direction and a global motion vector in L1 direction. In this case, the number of the reference views can be confirmed from inter-view reference information and can be obtained by being divided into the number of reference views in the L0 direction and the number of reference views in the L1 direction. In this case, all blocks within a slice use the same global motion vector obtained from the extension area of the sequence parameter set. And, different global motion vectors can be used in a macroblock layer. In this case, an index indicating the global motion vector may be identical to that of a global motion vector of a previously coded inter-view picture group. And, a view identification number of the global motion vector can be identical to an identification number of a view indicated by the global motion vector of the previously coded inter-view picture group.

For another instance, it is able to transmit a view identification number of a corresponding block having best efficiency calculated by an encoder. Namely, a view identification number of a selected reference view can be coded on a macroblock level. Alternatively, a view identification number of a selected reference view can be coded on a slice level. Alternatively, flag information enabling either a slice level or a macroblock level to be selected can be defined on the slice level. For example, if the flag information indicates a use on a macroblock level, a view identification number of a reference view can be parsed on a macroblock level. Alternatively, in case that the flag information indicates a use on a slice level, a view identification number of a reference view is parsed on a slice level but is not parsed on a macroblock level.

Meanwhile, information indicating which one of reference views included in reference view lists in L0 and L1 directions will be selected as a reference view may not be transmitted. If so, by checking whether motion information exists in a corresponding block of each of the reference views, it is able to determine a final reference view and a corresponding block. There can exist various embodiments about which one of reference views belonging to a prescribed one of the reference view lists in the L0 and L1 directions will be most preferentially checked. If motion information does not exist in the reference view, there can exist various embodiments about order to perform checking thereafter.

For instance, in priorities between reference views belonging to a specific reference view list, first of all, it is able to check reference views in order of a lower index indicating a reference view among the reference views included in the reference view list in the L0 direction (or the reference view list in the L1 direction). In this case, the index indicating the reference view can be a series of numbers of reference views set in coding a bit stream in an encoder. For example, in representing a reference view of a non-inter-view picture group in sequence extension information (SPS extension) as non_anchor_ref_l0[i] or non_anchor_ref_l1[i], 'i' may be an index indicating a reference view. In the encoder, it is able to assign lower indexes in order of being closer to a current view, which does not put limitation on the present invention. If an index 'i' starts from 0, a reference view of 'i=0' is checked, a reference view of 'i=1' is checked, and a reference view of 'i=2' can be then checked.

Referring to FIG. 7, in a first reference list RL1, a view ($V_{C-1}$=non_anchor_ref_l0[0]) having a lowest index indicating a reference view can be determined as a first reference view RV1. And, a block indicated by a global motion vector (GDV_l0[0]) between a current view Vc and a first reference view RV1 can be determined as a first corresponding block CB1. In case that the first corresponding block CB1 is not an intra block, the first corresponding block is finally determined as a corresponding block. And, motion information can be then derived from the first corresponding block.

On the other hand, if a block type of the first corresponding block CB1 is an intra block, a view ($V_{C+1}$=non_anchor_ref_l1[0]) having a lowest index in a second reference list RL2 can be determined as a second reference view RV2. And, based on a block type of a corresponding block, a block indicated by a global motion vector (GDV_l1[0]) between the current view Vc and a second reference view RV2 can be determined as a second corresponding block CB2. Like the above-mentioned method, it is able to sequentially check a third corresponding block CB3 of a third reference view RV3 and a fourth corresponding block CB4 of a fourth reference view RV4. Namely, by considering an index indicating a reference view, it is checked whether motion information exists by alternating the respective reference views of the L0-direction first reference list RL1 and the L1-direction second reference RL2.

For another instance, it is able to check reference views in order of closeness to the current view among reference views included in a reference view list in the L0 direction (or a reference view list in the L1 direction).

For another instance, it is able to check reference views in order of closeness to a base view among reference views included in a reference view list in the L0 direction (or a reference view list in the L1 direction).

Moreover, in priority between a reference view list in the L0 direction and a reference view list in the L1 direction, a reference view belonging to the reference view list in the L0 direction can be set to be checked prior to a reference view belonging to the reference view list in the L1 direction.

FIGS. 8A to 8D are diagrams for various examples to indicate a view used for a motion skip in case that at least one reference view is usable according to an embodiment of the present invention.

For first example, it is able to perform a motion skip using view identification information of a reference view used for the motion skip. An encoder calculates rate-distortions of all cases and a corresponding block having best efficiency can be then found. View identification information of the corresponding block can be transmitted to a decoder. For instance, referring to FIG. 8A, in case that a motion skip is performed on a current block [S820], it is able to obtain view identification information of the corresponding block [S830]. In this case, the view identification information of the corresponding block may mean a view identifier of a view used for a current block. And, view identification information of a reference view can be obtained only if a current picture corresponds to a non-inter-view picture group. And, view identification information of a reference view can be obtained based on inter-view reference information. For instance, identification information of the reference view can be obtained if an inter-view reference relation exists. In this case, the inter-view reference relation may mean an inter-view reference relation of a non-inter-view picture group for example. In particular, based on information on the number of inter-view reference pictures of a non-inter-view picture group, it is able to obtain view identification information of the reference view. If the number of inter-view reference pictures in a L0 direction of a non-inter-view picture group is greater than 0 or if the number of inter-view reference pictures in a L1 direction of a non-inter-view picture group is greater than 0, it is able to obtain the view identification information of the reference view [S810]. In this case, the view identification information of the reference view can be obtained from a sequence parameter set, an extension area of a sequence parameter set, a slice header or a macroblock layer.

Inter-view prediction is performed with the same view identifier of the obtained view identification information. Motion information of a current block can be then derived from a macroblock of a picture having the same POC of the current picture.

For second example, it is able to perform a motion skip using a reference index of a reference slice used for the motion skip. An encoder calculates rate-distortions of all cases and then assigns reference indexes in order of a picture (or a slice) having best efficiency. The reference index can be transmitted to a decoder. For instance, referring to FIG. 8B, in case that a motion skip is performed on a current block [S850], it is able to obtain a reference index of a slice including the current block [S860]. In this case, the reference index may mean a reference index of a slice used for the motion skip of the current block. And, the reference index can be obtained only if a current picture corresponds to a non-inter-view picture group. And, the reference index can be obtained based on inter-view reference information. For instance, the reference index can be obtained if an inter-view reference relation exists. In this case, the inter-view reference relation may mean an inter-view reference relation of a non-inter-view picture group for example. In particular, based on information on the number of inter-view reference pictures of a non-inter-view picture group, it is able to obtain the reference index. If the number of inter-view reference pictures in a L0 direction of a non-inter-view picture group is greater than 0 or if the number of inter-view reference pictures in a L1 direction of a non-inter-view picture group is greater than 0, it is able to obtain the reference index [S840]. In this case, the reference index can be obtained from a sequence parameter set, an extension area of a sequence parameter set, a slice header or a macroblock layer.

Inter-view prediction is performed with the same view identifier of the reference picture (or slice) indicated by the reference index. Motion information of a current block can be then derived from a macroblock of a picture having the same POC of the current picture.

For third example, it is able to perform a motion skip using a view index of a view used for the motion skip. An encoder calculates rate-distortions of all cases and then assigns view indexes in order of a view of a picture (or a slice) having best efficiency. The view index can be transmitted to a decoder. For instance, referring to FIG. 8C, in case that a motion skip is performed on a current block [S880], it is able to obtain a view index of a view used for the motion skip of the current block [S890]. And, the view index can be obtained only if a current picture corresponds to a non-inter-view picture group. And, the view index can be obtained based on inter-view reference information. For instance, the view index can be obtained if an inter-view reference relation exists. In this case, the inter-view reference relation may mean an inter-view reference relation of a non-inter-view picture group for example. In particular, based on information on the number of inter-view reference pictures of a non-inter-view picture group, it is able to obtain the view index. If the number of inter-view reference pictures in a L0 direction of a non-inter-view picture group is greater than 0 or if the number of inter-view reference pictures in a L1 direction of a non-inter-view picture group is greater than 0, it is able to obtain the view index [S870]. In this case, the view index can be obtained from a sequence parameter set, an extension area of a sequence parameter set, a slice header or a macroblock layer.

It is able to derive a global motion vector and view identification information of a reference block for performing the motion skip using the view index. For instance, referring to FIG. 8D, in case that a remainder resulting from dividing the view index by 2 is 0, it is able to use a global motion vector in a L0 direction and view identification information in the L0 direction for the motion skip. Yet, in case that a remainder resulting from dividing the view index by 2 is 1, it is able to use a global motion vector in a L1 direction and view identification information in the L1 direction for the motion skip. Moreover, by assigning the quotient (integer) resulting from dividing the view index by 2 to a global motion vector index, it is able to derive a global motion vector and view identification information of a reference block.

Finally, it is able to derive motion information of a current block from a macroblock indicated by the global motion vector in the same view of the view identification information of the reference block.

FIGS. 9A to 10B are diagrams to explain a method of performing inter-view prediction in case that a spatial resolution is different between views according to an embodiment of the present invention.

In case that spatial resolution differs between a current view and a reference view, a method of performing inter-view prediction may vary.

For first example, inter-view prediction can be performed using sampling of a reference picture. For instance, referring to FIG. 9A, if spatial resolution of a reference picture is greater than that of a current picture, the reference picture is down-sampled. Inter-view prediction is then performed using the down-sampled reference picture. If spatial resolution of a reference picture is smaller than that of a current picture, inter-view prediction can be performed by up-sampling of the current picture.

For second example, if a sampling process is not performed by an encoder, it is able to perform inter-view prediction using scaling of motion information of a reference picture. For instance, referring to FIG. 9B if spatial resolution of a reference picture is greater than that of a current picture, motion information of the reference picture is scaled. Motion information of the current block is then derived from the scaled motion information. In this case, the motion information may mean a motion vector, a global motion vector or the like. This is applicable in a similar manner if spatial resolution of a reference picture is smaller than that of a current picture.

In particular, after completion of scaling a current picture, it is able to derive motion information from a reference picture. This can be represented as Formula 6.

$$[MbX*(W0/W1)]+GDV \qquad \text{[Formula 6]}$$

In Formula 6, MbX indicates a horizontal position of a current block. This is scaled into resolution of a reference picture and GDV is then added thereto. Hence, it is able to derive a position of a corresponding block.

Figure 10A:
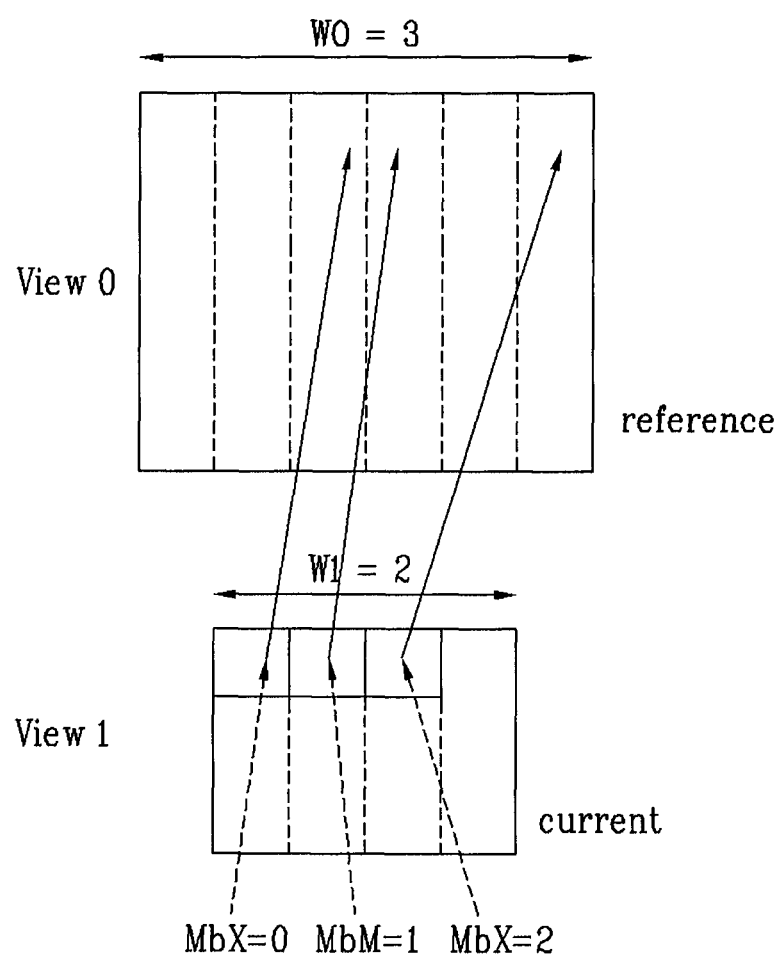

For instance, referring to FIG. 10A, in case that a horizontal position of a current macroblock is 0, 1 or 2, it is able to calculate a horizontal position of a corresponding block using Formula 6. Each example is represented as Formula 7.

$$[MbX*(W0/W1)]+GDV=[0*(3/2)]+2=2$$

$$[MbX*(W0/W1)]+GDV=[1*(3/2)]+2=3$$

$$[MbX*(W0/W1)]+GDV=[2*(3/2)]+2=5 \quad \text{[Formula 7]}$$

Namely, in case that a horizontal position of a current macroblock is 0, 1 or 2, a horizontal position of a corresponding block corresponds to 2, 3 or 5.

For another instance, it is able to derive motion information from a current picture after completion of scaling of a reference picture. This can be represented as Formula 8.

$$[(MBX+GDV)*(W0/W1)] \quad \text{[Formula 8]}$$

Likewise, MBX indicates a horizontal position of a current block. It is able to derive a horizontal position of a corresponding block by adding GDV to the horizontal position of the current block and then performing scaling with resolution of a reference picture.

Figure 10B:
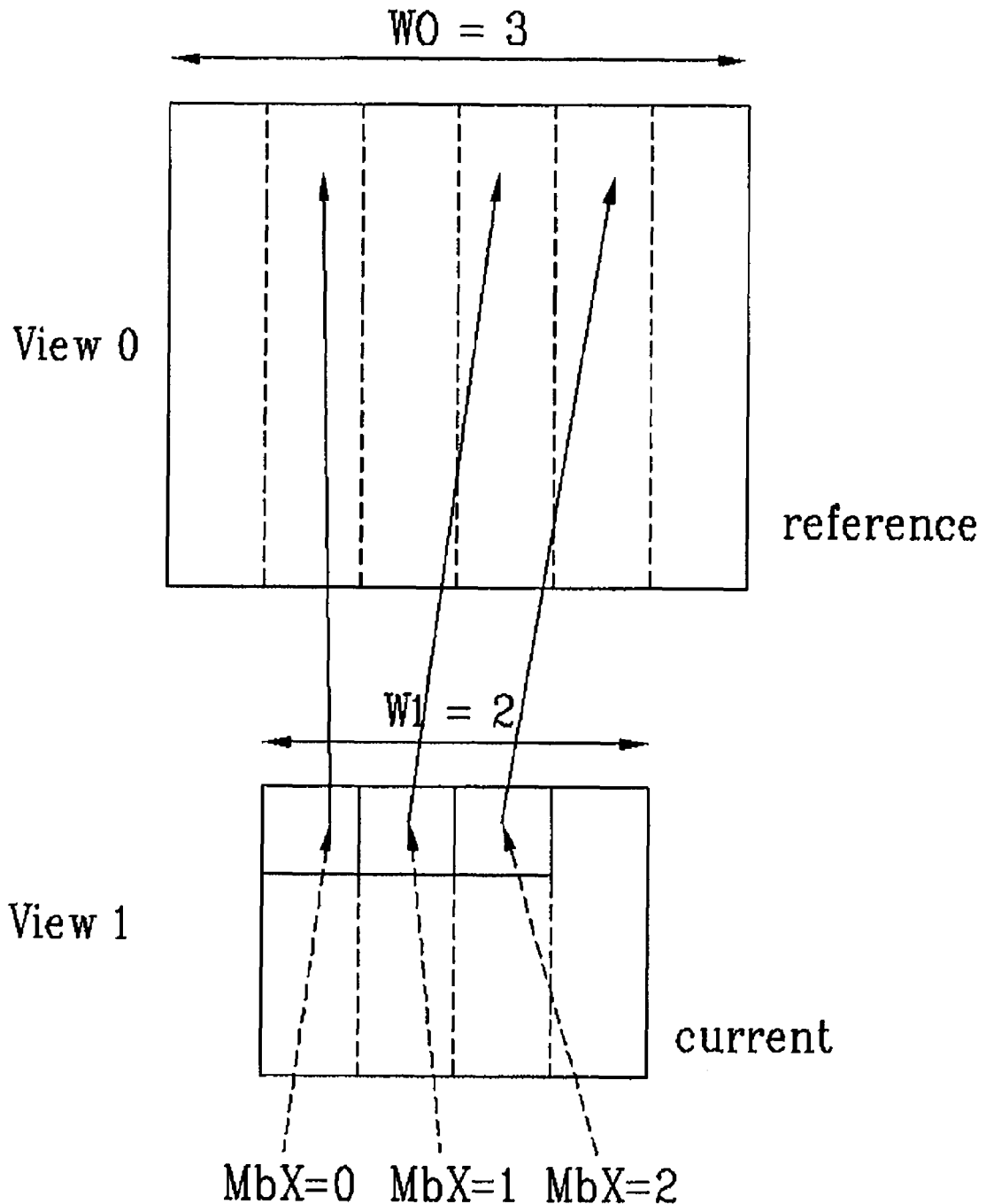

For instance, referring to FIG. 10B, in case that a horizontal position of a current macroblock is 0, 1 or 2, it is able to calculate a horizontal position of a corresponding block using Formula 8. Each example is represented as Formula 9.

$$[(MBX+GDV)*(W0/W1)]=[(0+1)*(3/2)]=1$$

$$[(MBX+GDV)*(W0/W1)]=[(1+1)*(3/2)]=3$$

$$[(MBX+GDV)*(W0/W1)]=[(2+1)*(3/2)]=4 \quad \text{[Formula 9]}$$

Namely, in case that a horizontal position of a current macroblock is 0, 1 or 2, a horizontal position of a corresponding block corresponds to 1, 3 or 4.

The above-mentioned methods are applicable in the same manner using information in a vertical direction.

Moreover, the above examples are applicable to a case that pictures in a reference view are fully reconstructed. And, the second example is applicable to a case that pictures in a reference view are partially reconstructed as well. Moreover, the above examples are applicable to a case that a motion skip is performed.

Figure 11:
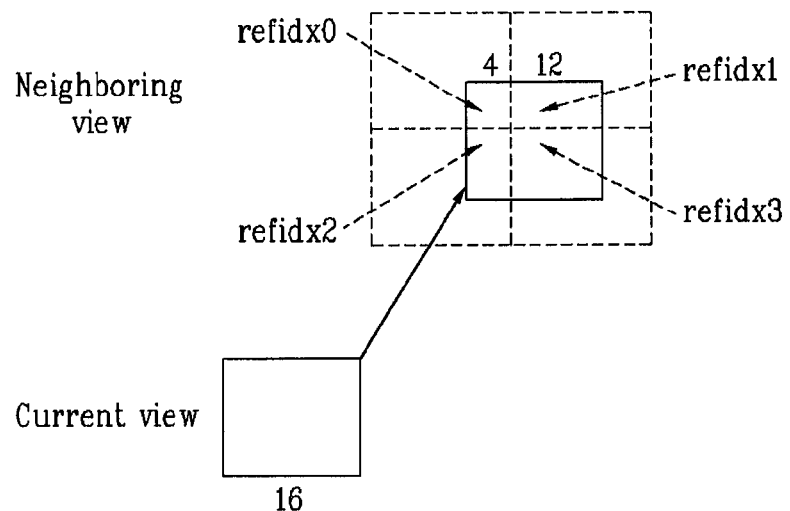
FIG. 11 is a diagram to explain a method of deriving a reference index in case that a motion skip is performed according to an embodiment of the present invention.

FIG. 11 is a diagram to explain a method of deriving a reference index in case that a motion skip is performed according to an embodiment of the present invention.

In case that a motion skip is performed, motion information of a current block can be derived from motion information of a corresponding block. In this case, the motion information can include a motion vector, a reference index, a block type and the like. In the following description, various embodiments for deriving a reference index are explained.

In inter-view prediction, a motion vector in a view direction may be needed to find a corresponding block. In this case, the motion vector may include a global motion vector. As mentioned in the foregoing descriptions of FIGS. 4 to 6, it is able to use a finer global motion vector to find a corresponding block having best efficiency in using a global motion vector. For instance, it is able to use a global motion vector of 16-pel, 8-pel or 4-pel unit. Thus, in case of using a global motion vector of a fine unit, a position of a corresponding block may not coincide with that of a macroblock. For this, there are various methods for deriving a reference index.

For instance, referring to FIG. 11, in case that a corresponding block indicated by a global motion vector is overlapped with a plurality of macroblocks, it is able to derive a reference index in various ways. In this case, if an unusable reference index exists among reference indexes of the overlapped macroblocks, it may not be used. For instance, a reference index can be used only if refidx>−1. For first example, it is able to use a most significant reference index only among usable reference indexes. For instance, it is able to use a reference index of a most overlapped area. For second example, it is able use a smallest reference index among usable reference indexes. For third example, it is able to use a largest reference index among usable reference indexes.

For another instance, in case that an intra-coded partition among overlapped macroblocks is included, it is able to derive motion information in various ways. For example, an intra-coded partition may not be used in case of deriving motion information.

For another instance, in case that an intra-coded partition among overlapped macroblocks is included, it is able to use information in a different view. Alternatively, it is able to derive motion information from 8×8 macroblocks adjacent to the intra-coded partition.

Figure 12:
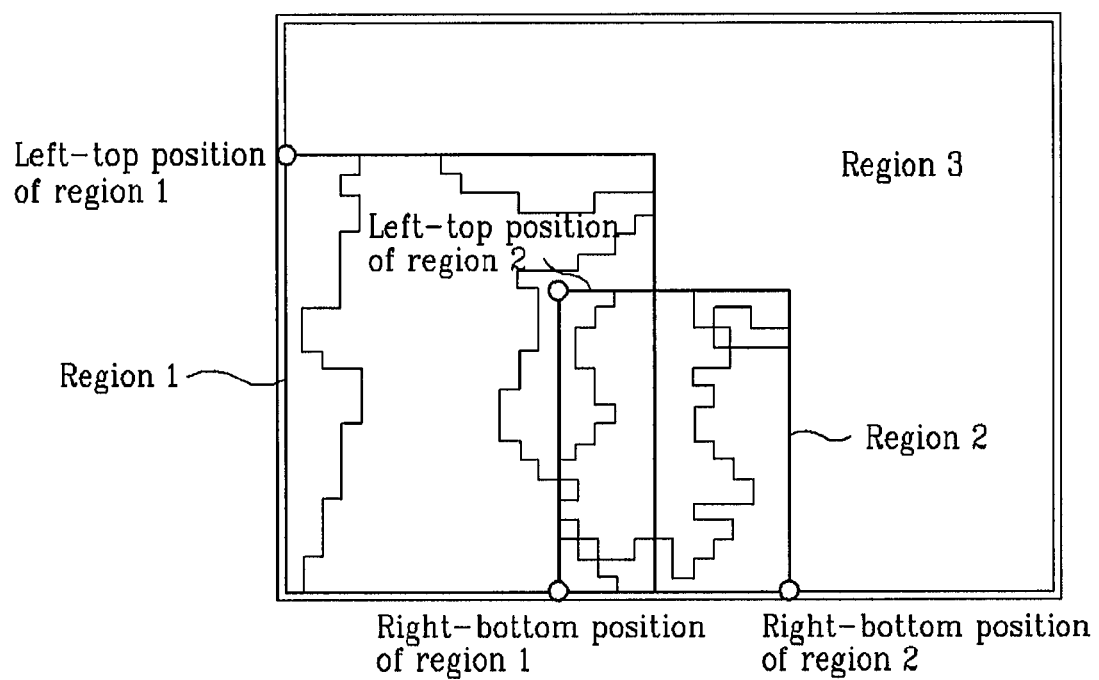
FIG. 12 is a diagram to explain various methods for obtaining a motion vector used for inter-view prediction according to an embodiment of the present invention.

FIG. 12 is a diagram to explain various methods for obtaining a motion vector used for inter-view prediction according to an embodiment of the present invention.

As mentioned in the foregoing description, a global motion vector may mean a motion vector applicable to a predetermined area in common. For instance, if a motion vector corresponds to a partial area (e.g., macroblock, block, pixel, etc.), the global motion vector (or a global disparity vector) may mean a motion vector corresponding to an overall area including the partial area. For instance, the overall area can correspond to a single slice, a single picture or a whole sequence. The overall area may correspond to at least one object within a picture, a background, or a predetermined area. The global motion vector may have a value of a pixel unit or ¼ pixel unit or a value of 4×4 unit, 8×8 unit or macroblock unit.

For first example, an area within a picture is divided into at least one or more regions. A global motion vector can be then obtained for each of the divided regions. For instance, in case that a picture is divided into sixteen equal parts, it is able to obtain a global motion vector corresponding to each of the parts. In this case, an index can be assigned to each of the sixteen equal parts. Moreover, the global motion vector can be obtained in case that a current picture corresponds to an inter-view picture group. Besides, the global motion vector can be set to be obtained in case that a current picture corresponds to a non-inter-view picture group. The requirements for obtaining the global motion vector are explained in detail in the description of FIG. 5. The requirements are applicable in the same manner.

For second example, in case that an area within a picture is divided into at least two regions, it is able to obtain a difference value between global motion vectors of the divided regions. For instance, it is able to obtain a difference value between a global motion vector of a region of an index 0 and a global motion vector of a region of an index 1. In this case, an initial value of the difference value can be set to the global motion vector of the region of the index 0. And, the global motion vector of the region of the index 1 can be derived from adding the global motion vector of the region of the index 0 to a transmitted difference value.

For another instance, in case that a remainder resulting from dividing an index value by 4 is 0, the difference value can be obtained using Formula 10.

$$\text{diff\_val\_of\_}GDV\_mb\_lX[j][idx] = GDV\_mb\_lX[j][idx-4] - GDV\_mb\_lX[j][idx] \quad \text{[Formula 10]}$$

In this case, idx may indicate a value ranging between 0~(the number of divided areas−1). Otherwise, the difference value can be obtained using Formula 11.

$$\text{diff\_val\_of\_}GDV\_mb\_lX[j][idx] = GDV\_mb\_lX[j][idx-1] - GDV\_mb\_lX[j][idx] \quad \text{[Formula 11]}$$

Moreover, the difference value can be obtained if a current picture corresponds to an inter-view picture group. Alternatively, the difference value can be set to be obtained if a current picture corresponds to a non-inter-view picture group. Requirements for obtaining the difference value are applicable in the same manner described with reference to FIG. 5.

For third example, an area within a picture is divided into at least one or more regions with reference to an object. A global motion vector can be then obtained for each of the divided regions. In this case, it is able to obtain information on the number of the divided regions and position information of each of the divided regions. For instance, referring to FIG. 12, it is able to divide an area into three regions with reference to two objects. In this case, it is able to obtain information indicating that there are three divided regions and position information of each of the divided regions. For instance, the position information can contain a left-top position information and a right-bottom position information.

The number information may mean the number of total regions within a slice. The number information is usable in performing a motion skip and can be obtained from a slice header. The number information can be obtained from a sequence level or a picture level. In this case, the number information may not exist on a slice level.

For another instance, if a position of a current block exists between a left-top position of the divided region and a right-bottom position of the divided region, it is able to assign an index to the divided region. Otherwise, it is able to repeatedly perform the above process by incrementing the index value by 1. A lower index provides a higher priority. In this case, the priority may mean the former priority described with reference to FIG. 2 in the foregoing description.

FIG. 13A and FIG. 13B are diagrams of syntaxes indicating scaled inter-view reference information according to an embodiment of the present invention.

First of all, it is able to define scaled inter-view reference information for a scaling technique. For instance, it is able to newly define inter-view reference information used for a motion skip. In particular, it is able to define information of the number of reference views used for the motion skip. In this case, the number information can be defined as num_motion_skip_refs_l0[i] or num_motion_skip_refs_l1[i] for example [S1310, S1330]. It is able to define view identification information of the reference view. For instance, the view identification information can be de defined as motion_skip_refs_l0[i][j], motion_skip_refs_l1[i][j] for example [S1320, S1340]. The inter-view reference information for the motion skip can be obtained from an extension area of a sequence parameter set.

In case that inter-view reference information used for the motion skip is defined, it is able to obtain motion skip flag information and a global motion vector based on the inter-view reference information [S1350]. Requirements for obtaining them are explained in detail with reference to FIGS. 4 to 6. And, the requirements are applicable in the similar manner.

Thus, in case that the scaled inter-view reference information is defined, original inter-view reference information may not be used. The scaled inter-view reference information can be independently obtained. And, the scaled inter-view reference information can be obtained together with the original inter-view reference information as well.

The scaled inter-view reference information can be added to an extension area of a sequence parameter set. The motion skip is operable aside from inter-view sample prediction. By setting an inter-view reference relation for views unusable for inter-view sample prediction, it is able to use the motion skip for the views unusable for the inter-view sample prediction.

For another instance, it is able to set flag information for controlling the scaled inter-view reference information. For instance, it is able to set sequence motion skip flag information indicating whether a motion skip is used for a current sequence. If a current sequence performs a motion skip according to the sequence motion skip flag information, it is able to obtain the scaled inter-view reference information.

For another instance, it is able to set flag information for controlling the sequence motion skip flag information. For instance, the sequence motion skip flag information can be obtained based on a partial decoding flag. In this case, if a current picture corresponds to a non-inter-view picture group, the partial decoding flag indicates whether the current picture can be decoded without fully reconstructing an inter-view reference picture. This is explained in detail in the foregoing description of FIG. 4.

Thus, in order to obtain the sequence motion skip flag, the above embodiments are applicable as independent requirements or any combination thereof. Moreover, the motion skip flag can be obtained without any requirements. For instance, the motion skip flag can be obtained from a sequence parameter set, a picture, a slice header, a macroblock layer and/or one of extension areas thereof.

Figure 14:
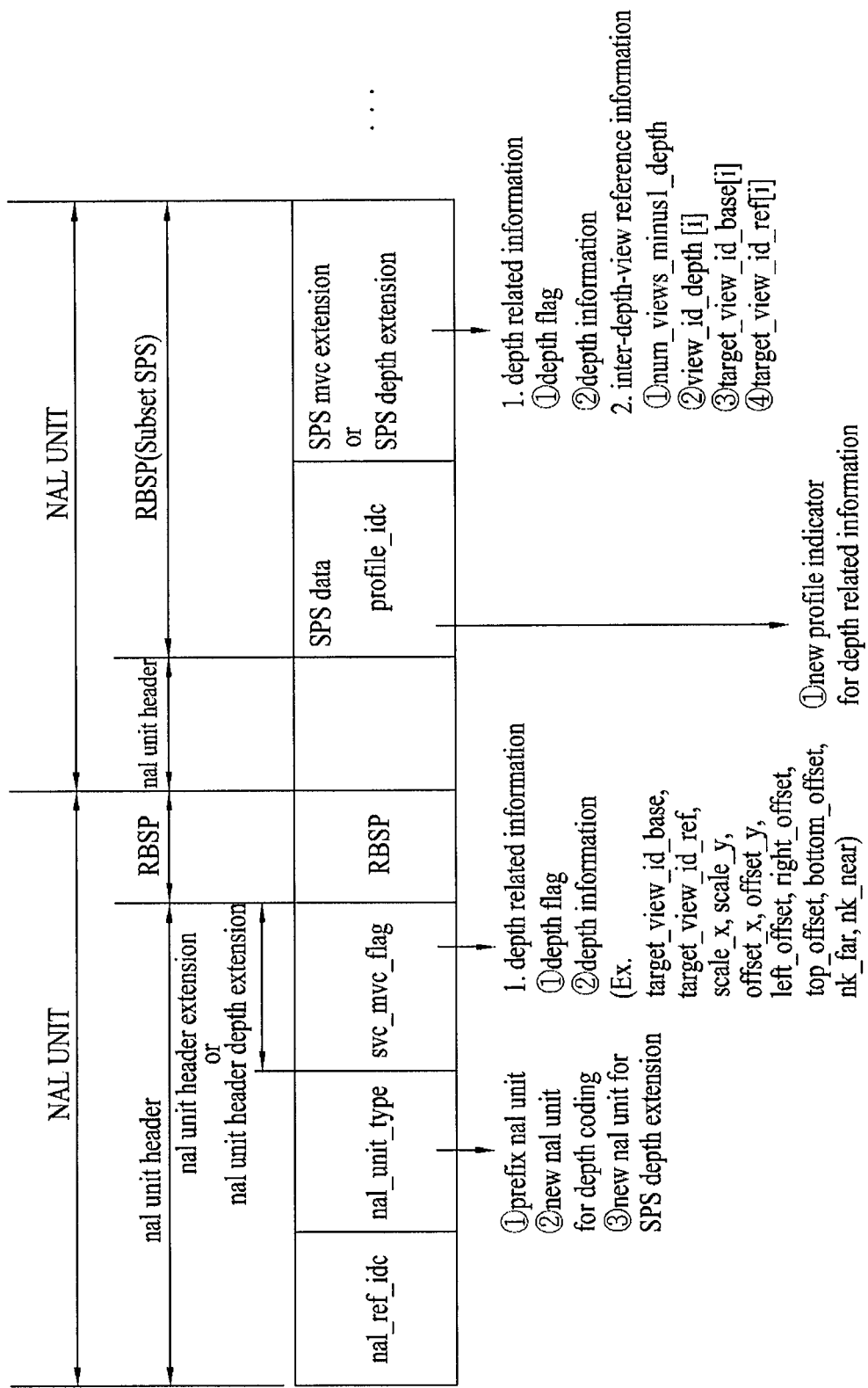
FIG. 14 is a diagram to explain various methods for transmitting depth information according to an embodiment of the present invention.

FIG. 14 is a diagram to explain various methods for transmitting depth information according to an embodiment of the present invention.

In video signal coding, it is able to use depth information for a specific application or a different purpose. The depth information may mean the information capable of indicating an inter-view disparity difference. For instance, it is able to obtain a disparity vector through inter-view prediction. And, the obtained disparity vector should be transmitted to a decoding device for disparity compensation of a current block. Yet, after a depth map has been found, if the depth map is transmitted to a decoding device, it is able to derive the disparity vector from the depth map (or a disparity map) without transmitting the disparity vector to the decoding device. In this case, it is able to reduce the number of bits of the depth information supposed to be transmitted to the decoding device. And, it is also able to transmit a motion vector or a disparity vector together with the depth map. Therefore, it is able to provide a new disparity compensating method can be provided by deriving a disparity vector from the depth map. In case of using a picture in a different view in the course of deriving the disparity vector from the depth map, view identification information can be used. In the following description, various methods of transmitting the depth information are explained.

According to an embodiment of the present invention, it is able to define flag information indicating whether a current NAL is a depth bitstream including depth informations or a general color bitstream. For instance, if depth_flag is 1, it may mean that a current NAL is a depth bitstream. If depth_flag is 0, it may mean that a current NAL is a color bitstream. If the current NAL means the depth stream according to the flag information, it is able to use configuration informations for multi-view video coding. This is because inter-view prediction may be necessary between depth informations. For instance, the configuration informations may include view identification information, inter-view picture group identification information, inter-view prediction flag information, temporal level information, priority identification information, identification indicating whether it is an instantaneous decoded picture for a view, and the like. This ex explained in detail in the description of FIG. 2.

Meanwhile, a depth map belonging to a current NAL can represent depths between a plurality of views. And, the depth information can include various kinds of informations. For instance, the depth information can include view identification information (target_view_id_base, target_view_id_ref) of the pictures related to the depth map. If there is a difference of spatial resolution between a color bitstream and a depth bitstream, there can exist scaling factors (scale_x, scale_y) in horizontal and vertical directions, respectively. Moreover, there can exist offset information (offset_x, offset_y) indicating horizontal and vertical position differences between a sampled depth picture and a sampled color picture. As examples for the offset information, there may exist offset informations (left_offset, top_offset, right_offset, bottom_offset) indicating top, bottom, left and right position differences between the up-sampled depth picture and a current picture. And, there can exist depth range information (nk_far, nk_near) indicating 'how far or near between pictures'.

According to another embodiment of the present invention, the depth informations can be transmitted by being put into a NAL unit header, a NAL unit RBSP or a sequence parameter set.

The NAL unit can include a NAL unit header and an RBSP (raw byte sequence payload: result data of moving picture compression). And, the NAL unit header can include nal_ref_idc and nal_unit_type. Moreover, an extension area of the NAL unit header can be limitedly included. For instance, if the information indicating the type of the NAL unit is related to scalable video coding or indicates a prefix NAL unit, the NAL unit is able to include an extension area of the NAL unit header. This is explained in detail in the foregoing description of FIG. 2. Besides, a sequence parameter set can include an extension area of a sequence parameter set, a multi-view extension area of a sequence parameter set, a depth extension area of a sequence parameter set or the like. Detailed embodiments for this are explained as follows.

For first example, in case that a current NAL corresponds to a base view, a method of transmitting the depth informations by purring them into a NAL unit header is explained as follows.

Base view may mean a view that can be coded independent from other views. The base view may mean at least one view for compatibility with a conventional decoder (e.g., H.264/AVC, MPEG-2, MPEG-4, etc.). Therefore, in case that a current NAL corresponds to a base view, it is unable to decode the depth informations due to the compatibility with the conventional decoder. Hence, it is able to insert the depth informations in a preceding prefix NAL unit. In this case, the prefix NAL unit may mean a NAL unit that includes description information of a following NAL unit. The prefix NAL unit may not include RBSP information. For instance, in case that a NAL unit type indicates a prefix NAL unit, a NAL unit header can include depth information. In particular, if nal_unit_type=14, a NAL unit header can include scalable extension information or multi-view extension information. And, the multi-view extension information can include depth information.

Moreover, it is able to add flag information (svc_mvc_flag) capable of identifying whether it is an MVC bitstream in the NAL header area or an extension area of the NAL header. In case that an inputted bitstream is a multi-view sequence coded bitstream according to the flag information, it is able to define flag information indicating whether depth related information exists in a current NAL unit. For instance, if depth_flag=1, it can be observed that the depth related information exists in the current NAL unit. In this case, the depth related information can be defined in an extension area of a NAL unit header. Alternatively, the depth related information can be defined within a depth extension area of the extension area of the NAL unit header separately.

For second example, in case that a current NAL fails to correspond to a base view, a method of transmitting the depth informations by purring them into a NAL unit header is explained as follows.

In case that a current NAL fails to correspond to a base view, the depth informations can be inserted in a multi-view extension NAL unit. For instance, if a NAL unit type indicates a scalable extension NAL unit or a multi-view extension NAL unit, a NAL unit header can include depth information. In particular, if nal_unit_type=20, a NAL unit header can include scalable extension information or multi-view extension information. The multi-view extension information can include depth information. In this case, a detailed method of defining the depth information is applicable in the manner similar to that of the method described for the first example.

For third example, if a current NAL unit corresponds to a base view, a method of transmitting the depth informations by inserting them in RBSP of a NAL unit is explained as follows.

As mentioned in the foregoing description of the first example, the depth informations can be inserted in a prefix NAL unit due to the compatibility with the conventional decoder. In the first example, the depth informations are inserted in the header of the prefix NAL unit. Yet, in the third example, the depth informations can be included in RBSP of a prefix NAL unit. In this case, it is able to define depth_flag in an extension area of a header of the prefix NAL unit. And, it is able to obtain depth informations from the RBSP of the prefix NAL unit based on the depth_flag information.

For fourth example, if a current NAL unit fails to correspond to a base view, a method of transmitting the depth informations by inserting them in RBSP of a NAL unit is explained as follows.

As mentioned in the foregoing description of the second example, the depth informations can be inserted in a multi-view extension NAL unit. In the second example, the depth informations are included in the header of the multi-view extension NAL unit. Yet, in the fourth example, the depth informations can be included in RBSP of a multi-view extension NAL unit. In this case, it is able to define depth_flag in an extension area of a header of the multi-view extension NAL unit. And, it is able to obtain depth informations from the RBSP of the multi-view extension NAL unit based on the depth_flag information.

For fifth example, if a current NAL corresponds to a base reference, a method of transmitting the depth informations by inserting them in a new NAL unit header is explained as follows.

It is able to define a new NAL unit type to transmit depth related informations. For instance, if nal_unit_type=21, it can be observed that depth related information exists in a current NAL unit. Like the first example, the depth informations can be inserted in a prefix NAL unit due to compatibility with a conventional decoder. It is able to obtain depth_flag only if a NAL unit type in an extension area of a NAL unit header is a prefix NAL unit. Therefore, it is able to obtain depth informations based on the depth_flag and the new NAL unit type. In this case, the depth related information can be defined within a depth extension area of the extension area of the NAL unit header separately.

For sixth example, if a current NAL fails to correspond to a base reference, a method of transmitting the depth informations by inserting them in a new NAL unit header is explained as follows.

Like the fifth example, it is able to define a new NAL unit type to transmit depth related informations. It is able to define depth related informations in a header of the new NAL unit type. For instance, if nal_unit_type=21, it is able to parse informations in an extension area of a NAL header. If svc_mvc_flag=1, it is able to parse configuration informations of a multi-view sequence. In this case, if nal_unit_type=21 in the extension area of the NAL header, it is able to parse depth extension area of the extension area of the NAL unit header.

After a new NAL unit type has been checked, it is able to directly parse a depth extension area of a NAL unit header. In this case, multi-view sequence configuration informations within the extension area of the NAL unit header can be defined in the depth extension area of the NAL unit header.

For seventh example, if a current NAL corresponds to a base view, a method of transmitting the depth informations by inserting them in RBSP of a new NAL unit is explained as follows.

Like the fifth example, the depth informations can be inserted in a prefix NAL unit due to compatibility with a conventional decoder. It is able to obtain depth_flag only if a NAL unit type in an extension area of a NAL unit header is a prefix NAL unit. In this case, it can be defined within a depth extension area of the extension area of the NAL unit header separately. It is able to obtain depth informations from the RBSP of the prefix NAL unit based on the depth_flag. For instance, if nal_unit_type=14, it is able to parse informations in the extension area of the NAL header. If svc_mvc_flag=1, it is able to parse configuration informations of a multi-view sequence. In this case, if nal_unit_type=14 in the extension area of the NAL header, it is able to parse depth_flag. If depth_flag=1 in the RBSP of the prefix NAL unit, it is able to obtain depth informations.

For eighth example, if a current NAL fails to correspond to a base view, a method of transmitting the depth informations by inserting them in RBSP of a new NAL unit is explained as follows.

Like the sixth example, it is able to define a new NAL unit type to transmit depth related informations. It is able to define depth related informations in RBSP of the new NAL unit type. For instance, if nal_unit_type=21, it is able to parse informations in an extension area of a NAL header. If svc_mvc_flag=1, it is able to parse configuration informations of a multi-view sequence. In this case, if nal_unit_type=21 in the extension area of the NAL header, it is able to parse depth extension area of the of the NAL unit header.

After the new NAL unit type has been checked, it is able to directly parse a depth extension area of a NAL unit header. In this case, multi-view sequence configuration informations within the extension area of the NAL unit header can be defined in the depth extension area of the NAL unit header.

For ninth example, it is able to define inter-view reference information on depth information within a sequence parameter set. Hereinafter, when a view is named for depth information, it is named a depth view. For instance, there can exist the total number of coded depth views (num_views_minus1_depth), view identification information of the depth view with coding order (view_id_depth[i]), view identification information (target_view_id_base[i], target_view_id_ref[i]) of color video views (base view, reference view) required for reconstructing a depth view, and the like.

In case that information indicating a type of a NAL unit is information indicating a sequence parameter set, the RBSP can include information on the sequence parameter set. In particular, if nal_unit_type=7, the RBSP can include the information on the sequence parameter set. If nal_unit_type=15, the RBSP can include the information on a subset sequence parameter set. In this case, the subset sequence parameter set can include an extension area of the sequence parameter set according to profile information.

For instance, if profile information (profile_idc) is a profile related to multi-view video coding, the subset sequence parameter set can include an extension area of the sequence parameter set. The extension area of the sequence parameter set can include inter-depth-view reference information indicating depth inter-view dependency. Moreover, the extension area of the sequence parameter set can include the depth informations explained in the description of FIG. 14.

Alternatively, it is able to newly define profile information (profile_idc) for depth related informations. For instance, if profile information is the profile related to depth information coding, the subset sequence parameter set can include an extension area of the sequence parameter set. Likewise, the extension area of the sequence parameter set can include inter-depth-view reference information and/or depth informations based on the new profile information.

Alternatively, it is able to newly define a depth extension area of a sequence parameter set based on the new profile information (profile_idc). In this case, the depth extension area of the sequence parameter set can include inter-depth-view reference information and/or depth informations.

Alternatively, it is able to newly define a NAL unit type of the depth extension area of the sequence parameter set. For instance, it is able to define a depth extension area of a new sequence parameter set according to the new NAL unit type. And, the extension area of the sequence parameter set can include inter-depth-view reference information and/or depth informations. Moreover, the extension area of the sequence parameter set can include horizontal length information of a decoded picture and vertical length informations of slice group map unit of a decoded frame/field. This may be needed to compensate for a spatial resolution difference between a color picture and a depth picture.

As mentioned in the foregoing description, the decoding/encoding device, to which the present invention is applied, is provided to a transmitter/receiver for multimedia broadcasting such as DMB (digital multimedia broadcast) to be used in decoding video and data signals and the like. And, the multimedia broadcast transmitter/receiver can include a mobile communication terminal.

A decoding/encoding method, to which the present invention is applied, is configured with a program for computer execution and then stored in a computer-readable recording medium. And, multimedia data having a data structure of the present invention can be stored in computer-readable recording medium. The computer-readable recording media include all kinds of storage devices for storing data that can be read by a computer system. The computer-readable recording media include ROM, RAM, CD-ROM, magnetic tapes, floppy discs, optical data storage devices, etc. and also includes a device implemented with carrier waves (e.g., transmission via internet). And, a bit stream generated by the encoding method is stored in a computer-readable recording medium or transmitted via wire/wireless communication network.

INDUSTRIAL APPLICABILITY

Accordingly, while the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

What is claimed is:

1. A method of decoding a video signal with a decoding apparatus, comprising:
   obtaining, with the decoding apparatus, first flag information and a global motion vector from a video signal bitstream, the first flag information indicating whether or not a current slice uses motion skip, the global motion vector representing a position difference between a current block in a current view and a corresponding block in a neighboring view of the current view;
   obtaining, with the decoding apparatus, second flag information from a block layer of the video signal bitstream based on the first flag information, the second flag information indicating whether or not motion information of the current block is derived from a reference block in the neighboring view;
   obtaining, with the decoding apparatus, offset refinement information of the current block based on the second flag information, the offset refinement information representing a position difference between the corresponding block indicated by the global motion vector and the reference block;
   obtaining, with the decoding apparatus, a refined global motion vector of the current block using the global motion vector and the offset refinement information;
   searching, with the decoding apparatus, the reference block using the refined global motion vector;
   deriving, with the decoding apparatus, the motion information of the current block from the reference block;
   decoding, with the decoding apparatus, the current block using the motion information of the current block,
   wherein the first flag information is obtained based on inter-view picture group identification information and inter-view reference information, the inter-view picture group identification information indicating whether a coded picture of a current NAL unit is an inter-view picture group or a non-inter-view picture group, the inter-view picture group being a coded picture that refers to only slices on a same time zone with the inter-view picture group, the inter-view reference information indicating inter-view reference relation, the inter-view reference information including a number of inter-view reference pictures of the non-inter-view picture group.

2. The method of claim 1, wherein the first flag information is obtained from a slice header.

3. The method of claim 1, wherein the first flag information is obtained when a current picture corresponds to the non-inter-view picture group according to the inter-view picture group identification information.

4. The method of claim 1, wherein the first flag information is obtained when the number of the inter-view reference pictures of the non-inter-view picture group is greater than 0.

5. The method of claim 1, wherein the inter-view reference information is obtained from an extension area of a sequence parameter set.

6. The method of claim 1, wherein the global motion vector is obtained based on the inter-view reference information indicating inter-view reference relation.

7. The method of claim 6, wherein the the global motion vector is obtained as many as the number of the inter-view reference pictures of the non-inter-view picture group.

8. The method of claim 1, wherein the global motion vector is obtained based on the inter-view picture group identification information.

9. The method of claim 8, wherein when a current picture corresponds to the inter-view picture group according to the inter-view picture group identification information, the global motion vector is obtained.

10. The method of claim 1, wherein the video signal is received as a broadcast signal.

11. The method of claim 1, wherein the video signal is received via digital medium.

12. An apparatus for decoding a video signal, comprising:
    a motion skip determining unit configured to,
        obtain first flag information and a global motion vector from a video signal bitstream, the first flag information indicating whether or not a current slice uses motion skip, the global motion vector representing a position difference between a current block in a current view and a corresponding block in a neighboring view of the current view,
        obtain, from a block layer of the video signal bitstream, second flag information based on the first flag information, the second flag information indicating whether or not motion information of the current block is derived from a reference block in the neighboring view,
        obtain offset refinement information of the current block based on the second flag information, the offset refinement information representing a position difference between the corresponding block indicated by the global motion vector and the reference block, and
        obtain a refined global motion vector of the current block using the global motion vector and the offset refinement information;
    a corresponding block searching unit configured to search the reference block using the refined global motion vector;
    a motion information deriving unit configured to derive the motion information of the current block from the reference block; and
    a motion compensating unit configured to decode the current block using the motion information of the current block,
    wherein the first flag information is obtained based on inter-view picture group identification information and inter-view reference information, the inter-view picture group identification information indicating whether a coded picture of a current NAL unit is an inter-view picture group or a non-inter-view picture group, the inter-view picture group being an coded picture that refers to only slices on a same time zone with the inter-view picture group, the inter-view reference information indicating inter-view reference relation, the inter-view reference information including a number of inter-view reference pictures of the non-inter-view picture group.

* * * * *